US011216245B2

(12) United States Patent
Lee

(10) Patent No.: US 11,216,245 B2
(45) Date of Patent: Jan. 4, 2022

(54) ELECTRONIC DEVICE AND MULTITASKING SUPPORTING METHOD THEREOF

(71) Applicant: Samsung Electronics Co., Ltd., Suwon-si (KR)

(72) Inventor: Seungyup Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/828,131

(22) Filed: Mar. 24, 2020

(65) Prior Publication Data

US 2020/0310752 A1 Oct. 1, 2020

(30) Foreign Application Priority Data

Mar. 25, 2019 (KR) .................. 10-2019-0033362

(51) Int. Cl.
| | | |
|---|---|---|
| *G06F 3/048* | (2013.01) | |
| *G06F 3/16* | (2006.01) | |
| *G06F 3/0488* | (2013.01) | |
| *G10L 15/22* | (2006.01) | |
| *G06F 3/0481* | (2013.01) | |
| *G10L 15/26* | (2006.01) | |

(52) U.S. Cl.
CPC .......... *G06F 3/167* (2013.01); *G06F 3/04817* (2013.01); *G06F 3/04886* (2013.01); *G10L 15/22* (2013.01); *G10L 15/26* (2013.01)

(58) Field of Classification Search
None
See application file for complete search history.

(56) References Cited

U.S. PATENT DOCUMENTS

| | | |
|---|---|---|
| 6,401,065 B1 | 6/2002 | Kanevsky et al. |
| 8,751,217 B2 | 6/2014 | Ballinger et al. |
| 8,918,814 B2 | 12/2014 | Yabe et al. |
| 9,031,830 B2 | 5/2015 | Ballinger et al. |
| 9,047,870 B2 | 6/2015 | Ballinger et al. |

(Continued)

FOREIGN PATENT DOCUMENTS

KR 10-1448336 B1 10/2014

OTHER PUBLICATIONS

International Search Report dated Jul. 29, 2020, issued in International Patent Application No. PCT/KR2020/004064.

*Primary Examiner* — William C Trapanese
(74) *Attorney, Agent, or Firm* — Jefferson IP Law, LLP

(57) ABSTRACT

An electronic device is provided. The electronic device includes a microphone, a touchscreen display, a processor, and a memory. The memory stores instructions, when executed, causing the processor to display a virtual keyboard including a first icon on the touchscreen display in response to a request associated with a text input to a first application which is running, execute a client module associated with a second application, based on an input to the first icon, identify a text entered through the virtual keyboard or a voice input received via the microphone, using the client module, determine an operation corresponding to the entered text and the voice input using the client module, and display a result image according to the operation on at least one region between a first region of the touchscreen display or a second region of the touchscreen display is displayed.

20 Claims, 24 Drawing Sheets

(56) References Cited

U.S. PATENT DOCUMENTS

| | | |
|---|---|---|
| 9,251,791 B2 | 2/2016 | Ballinger et al. |
| 9,495,127 B2 | 11/2016 | Ballinger et al. |
| 9,495,176 B2 | 11/2016 | Joung et al. |
| 9,977,595 B2 | 5/2018 | Choi |
| 10,157,040 B2 | 12/2018 | Ballinger et al. |
| 10,222,957 B2 | 3/2019 | Choi |
| 10,409,488 B2 | 9/2019 | Paek et al. |
| 2009/0031350 A1 | 1/2009 | Yabe et al. |
| 2014/0258182 A1 | 9/2014 | Joung et al. |
| 2016/0077793 A1* | 3/2016 | Disano ............... G06F 3/04883 715/728 |
| 2016/0132293 A1 | 5/2016 | Ballinger et al. |
| 2017/0308273 A1 | 10/2017 | Choi |
| 2017/0308292 A1 | 10/2017 | Choi |
| 2017/0357443 A1* | 12/2017 | Paek .................... G06F 3/0482 |

\* cited by examiner

| Prompt | Find | | Finalize | Done |
|---|---|---|---|---|
| "I need to book a hotel near Jeju airport this weekend" | | | | Here are some options 700<br>Red Sky $43<br>Maison jeju $168 |

FIG. 7

ELECTRONIC DEVICE AND MULTITASKING SUPPORTING METHOD THEREOF

CROSS-REFERENCE TO RELATED APPLICATION(S)

This application is based on and claims priority under 35 U.S.C. § 119(a) of a Korean Patent Application number 10-2019-0033362, filed on Mar. 25, 2019, in the Korean Intellectual Property Office, the disclosure of which is incorporated by reference herein in its entirety.

BACKGROUND

1. Field

The disclosure relates to technologies about a user interface (UI) based on a virtual keyboard.

2. Description of Related Art

An electronic device may provide a service capable of conveniently using another application while a foreground application is in use. For example, the electronic device may display an icon associated with the other application (e.g., an icon for running a web browser) on one region of a virtual keyboard and may provide functions of the other application based on a selection for the icon associated with the other application. In this process, the electronic device may guide the result of performing the function of the other application using a region where the virtual keyboard is displayed.

The above information is presented as background information only to assist with an understanding of the disclosure. No determination has been made, and no assertion is made, as to whether any of the above might be applicable as prior art with regard to the disclosure.

SUMMARY

Meanwhile, because a region of a virtual keyboard is limited, the number and functions of the icons associated with another application, capable of being displayed on the virtual keyboard, are limited.

Aspects of the disclosure are to address at least the above-mentioned problems and/or disadvantages and to provide at least the advantages described below. Accordingly, an aspect of the disclosure is to provide an electronic device for performing various functions based on a text command (or an input text) entered through a virtual keyboard or a voice command recognized via a microphone, while a first application is running, and a multitasking method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a microphone, a touchscreen display, a processor operatively connected with the microphone and the touchscreen display, and a memory operatively connected with the processor. The memory may be configured to store instructions. The instructions, when executed, may cause the processor to display a virtual keyboard including a first icon on the touchscreen display in response to a request associated with a text input to a first application which is running, execute a client module associated with a second application different from the first application, based on an input to the first icon, identify a text entered through the virtual keyboard or a voice input received via the microphone, using the client module, determine an operation corresponding to the entered text and the voice input using the client module, and display a result image according to the operation on at least one region between a first region of the touchscreen display, on which the virtual keyboard is displayed, or a second region of the touchscreen display, on which a screen where the first application is running is displayed.

In accordance with another aspect of the disclosure, an electronic device is provided. The electronic device includes a microphone, a touchscreen display, a processor operatively connected with the microphone and the touchscreen display, and a memory operatively connected with the processor. The memory may be configured to store instructions. The instructions, when executed, may cause the processor to display a virtual keyboard including a first icon associated with running a second application different from a first application on the touchscreen display in response to a request associated with a text input to the first application, while the first application is running, when receiving a request associated with transmitting a text entered through a virtual keyboard, transmit the entered text to the first application and a client module associated with the second application, determine an operation corresponding to the entered text using the client module, and display a result image corresponding to the operation on at least one region between a first region of the touchscreen display, on which the virtual keyboard is displayed, or a second region of the touchscreen display, on which a screen where the first application is running is displayed.

In accordance with another aspect of the disclosure, a multitasking method is provided. The multitasking method includes displaying a virtual keyboard including a first icon on a touchscreen display in response to a request associated with a text input to a first application which is running, executing a client module associated with a second application different from the first application, based on an input to the first icon, identifying a text entered through the virtual keyboard or a voice input received via a microphone using the client module, determining an operation corresponding to the entered text or the voice input using the client module, and displaying a result image according to the operation on at least one region between a first region of the touchscreen display, on which the virtual keyboard is displayed, or a second region of the touchscreen display, on which a screen where the first application is running is displayed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a drawing illustrating an embodiment of displaying content received from an intelligence server on a screen at an electronic device according to an embodiment of FIG. 6 of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
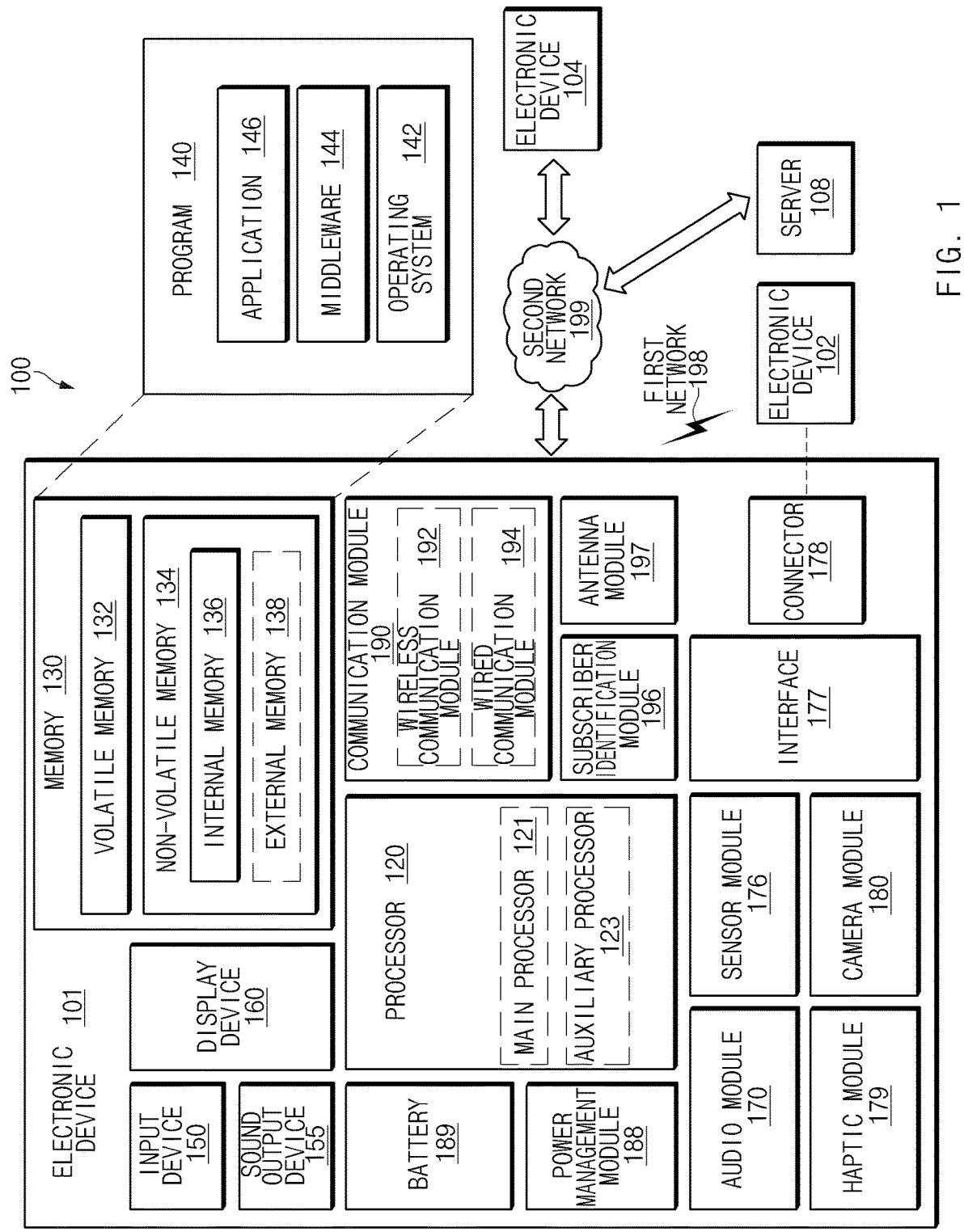
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
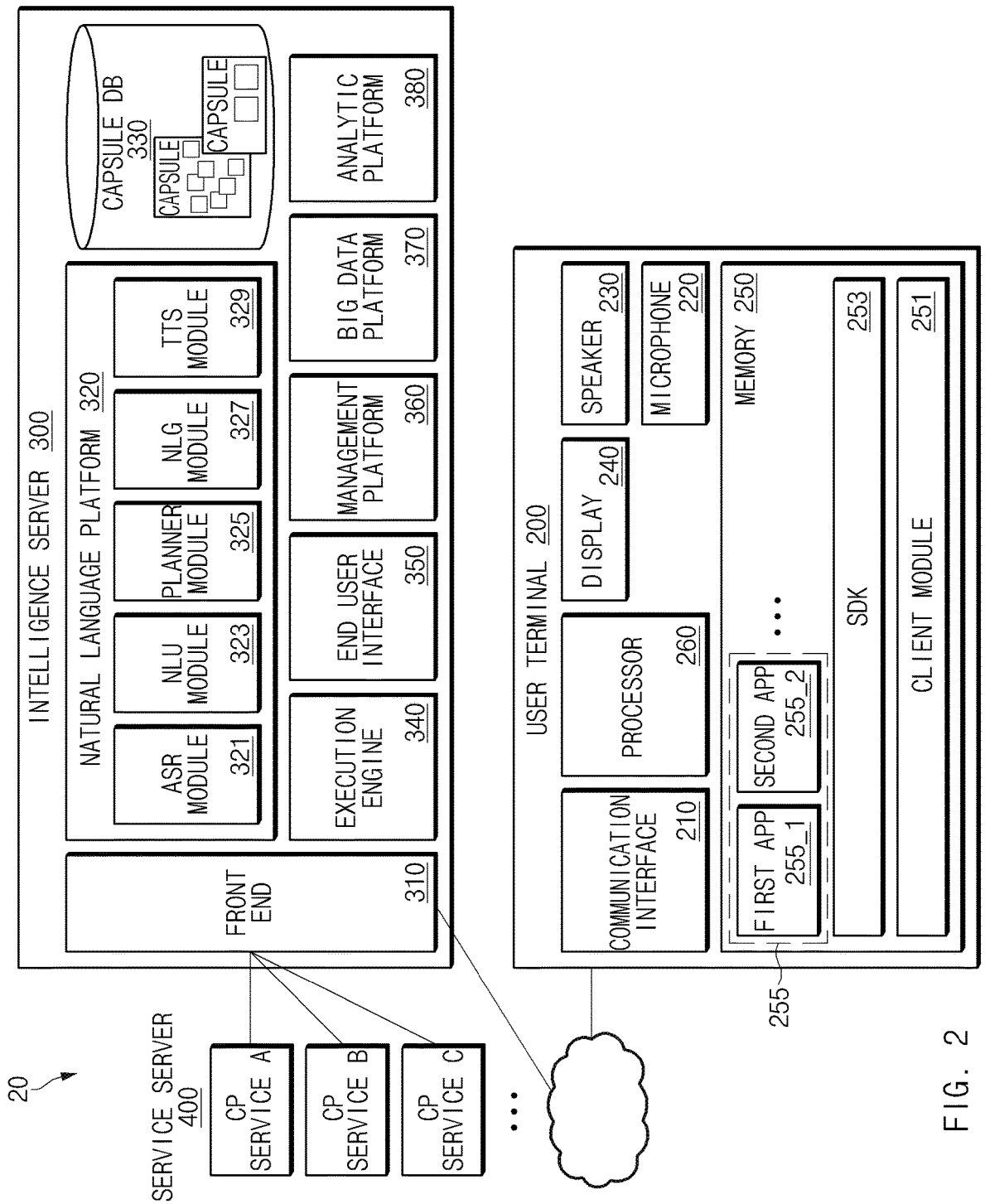
FIG. 2 is a block diagram of an integrated intelligence system according to an embodiment of the disclosure.

FIG. 2 is a block diagram of an integrated intelligence system, according to an embodiment of the disclosure.

Referring to FIG. 2, an integrated intelligence system 20 according to an embodiment may include a user terminal 200 (e.g., the electronic device 101 of FIG. 1), an intelligence server 300 (e.g., the server 108 of FIG. 1), and a service server 400.

The user terminal 200 according to an embodiment may be a terminal device (or an electronic apparatus) capable of connecting to Internet, and may be, for example, a mobile phone, a smartphone, a personal digital assistant (PDA), a notebook computer, TV, a white household appliance, a wearable device, a head mount display (HMD), or a smart speaker.

According to the illustrated embodiment, the user terminal 200 may include a communication interface 210 (e.g., the communication module 190 of FIG. 1), a microphone 220 (e.g., the input device 150 of FIG. 1), a speaker 230 (e.g., the sound output device 155 of FIG. 1), a display 240 (e.g., the display device 160 of FIG. 1), a memory 250 (e.g., the memory 130 of FIG. 1), or a processor 260 (e.g., the processor 120 of FIG. 1). The listed components may be operatively or electrically connected to one another.

According to an embodiment, the communication interface 210 may be configured to transmit or receive data to or from an external device. According to an embodiment, the microphone 220 may receive a sound (e.g., a user utterance) to convert the sound into an electrical signal. According to an embodiment, the speaker 230 may output the electrical signal as a sound (e.g., voice). According to an embodiment, the display 240 may be configured to display an image or a video. According to an embodiment, in addition, the display 240 may display the graphic user interface (GUI) of the running app (or an application program).

According to an embodiment, the memory 250 may store a client module 251, a software development kit (SDK) 253, and a plurality of apps 255. The client module 251 and the SDK 253 may constitute a framework (or a solution program) for performing general-purposed functions. Furthermore, the client module 251 or the SDK 253 may constitute the framework for processing a voice input.

According to an embodiment, the plurality of apps 255 in the memory 250 may be a program for performing the specified function. According to an embodiment, the plurality of apps 255 may include a first app 255_1 and a second app 255_2. According to an embodiment, each of the plurality of apps 255 may include a plurality of actions for performing the specified function. For example, the apps 255 may include an alarm app, a message app, and/or a schedule app. According to an embodiment, the plurality of apps 255 may be executed by the processor 260 to sequentially execute at least part of the plurality of actions.

According to an embodiment, the processor 260 may control overall operations of the user terminal 200. For example, the processor 260 may be electrically connected to the communication interface 210, the microphone 220, the speaker 230, and the display 240 to perform a specified action.

According to an embodiment, the processor 260 may also execute the program stored in the memory 250 to perform the specified function. For example, the processor 260 may execute at least one of the client module 251 or the SDK 253 to perform the following actions for processing a voice input. The processor 260 may control the actions of the plurality of apps 255 via the SDK 253. The following actions described as the actions of the client module 251 or the SDK 253 may be the action by the execution of the processor 260.

According to an embodiment, the client module 251 may receive a voice input. For example, the client module 251 may receive a voice signal corresponding to a user utterance detected via the microphone 220. The client module 251 may transmit the received voice input to the intelligence server 300. The client module 251 may transmit the state information of the user terminal 200 together with the received voice input, to the intelligence server 300. For example, the state information may be the execution state information of an app.

According to an embodiment, the client module 251 may receive the result corresponding to the received voice input. For example, when calculating the result corresponding to the voice input received from the intelligence server 300, the client module 251 may receive the result corresponding to the received voice input. The client module 251 may display the received result in the display 240.

According to an embodiment, the client module 251 may receive the plan corresponding to the received voice input. The client module 251 may display the result of executing a plurality of actions of an app in the display 240 depending on the plan. For example, the client module 251 may sequentially display the execution result of a plurality of actions in the display 240. For another example, the user terminal 200 may display only a part of results (e.g., the result of the last action) of executing a plurality of actions, on the display.

According to an embodiment, the client module 251 may receive a request for obtaining information necessary to calculate the result corresponding to a voice input, from the intelligence server 300. According to an embodiment, the client module 251 may transmit the necessary information to the intelligence server 300 in response to the request.

According to an embodiment, the client module 251 may transmit information about the result of executing a plurality of actions depending on the plan, to the intelligence server 300. The intelligence server 300 may determine that the received voice input is processed correctly, using the result information.

According to an embodiment, the client module 251 may include a voice recognition module. According to an embodiment, the client module 251 may recognize a voice input to perform the limited function, via the voice recognition module. For example, the client module 251 may launch an intelligence app that processes a voice input for performing an organic action, via a specified input (e.g., wake up!).

According to an embodiment, the intelligence server 300 may receive the information associated with a user's voice input from the user terminal 200 over a communication network. According to an embodiment, the intelligence server 300 may change the data associated with the received voice input to text data. According to an embodiment, the intelligence server 300 may generate a plan for performing a task corresponding to a user voice input, based on the text data.

According to an embodiment, the plan may be generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the plan may be selected from a set of predefined plans or may be generated in real time in response to a user request. For example, the AI system may select at least one plan of the plurality of predefined plans.

According to an embodiment, the intelligence server 300 may transmit the result according to the generated plan to the user terminal 200 or may transmit the generated plan to the user terminal 200. According to an embodiment, the user terminal 200 may display the result according to the plan, on a display. According to an embodiment, the user terminal 200 may display the result of executing the action according to the plan, on the display 240.

The intelligence server 300 according to an embodiment may include a front end 310, a natural language platform 320, a capsule DB 330, an execution engine 340, an end user interface 350, a management platform 360, a big data platform 370, or an analytic platform 380.

According to an embodiment, the front end 310 may receive a voice input received from the user terminal 200. The front end 310 may transmit a response corresponding to the voice input.

According to an embodiment, the natural language platform 320 may include an automatic speech recognition (ASR) module 321, a natural language understanding (NLU) module 323, a planner module 325, a natural language generator (NLG) module 327, or a text to speech module (TTS) module 329.

According to an embodiment, the ASR module 321 may convert the voice input received from the user terminal 200 to text data. According to an embodiment, the NLU module 323 may grasp the intent of the user, using the text data of the voice input. For example, the NLU module 323 may grasp the intent of the user by performing syntactic analysis or semantic analysis. According to an embodiment, the NLU module 323 may grasp the meaning of words extracted from the voice input by using linguistic features (e.g., syntactic elements) such as morphemes or phrases and may determine the intent of the user by matching the grasped meaning of the words to an intent.

According to an embodiment, the planner module 325 may generate the plan by using the intent and a parameter, which are determined by the NLU module 323. According to an embodiment, the planner module 325 may determine a plurality of domains necessary to perform a task, based on the determined intent. The planner module 325 may determine a plurality of actions included in each of the plurality of domains determined based on the intent. According to an embodiment, the planner module 325 may determine the parameter necessary to perform the determined plurality of actions or the result value output by the execution of the plurality of actions. The parameter and the result value may be defined as a concept of the specified form (or class). As such, the plan may include the plurality of actions and a plurality of concepts determined by the intent of the user. The planner module 325 may determine the relationship between the plurality of actions and the plurality of concepts stepwise (or hierarchically). For example, the planner module 325 may determine the execution sequence of the plurality of actions, which are determined based on a user's intent, based on the plurality of concepts. In other words, the planner module 325 may determine the execution sequence of the plurality of actions, based on the parameters necessary to perform the plurality of actions and the result output by the execution of the plurality of actions. As such, the planner module 325 may generate a plan including information (e.g., ontology) of the relationship between a plurality of actions and a plurality of concepts. The planner module 325 may generate the plan, using the information stored in the capsule DB 330 storing a set of relationships between concepts and actions.

According to an embodiment, the NLG module 327 may change the specified information into information in the text form. The information changed to the text form may be a form of a natural language utterance. The TTS module 329 according to an embodiment may change information of the text form to information of a voice form.

According to an embodiment, all or part of the functions of the natural language platform 320 may be also implemented in the user terminal 200.

The capsule DB 330 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 330 may store the plurality of capsules in the form of a concept action network (CAN). According to an embodiment, the plurality of capsules may be stored in the function registry included in the capsule DB 330.

According to an embodiment, the capsule DB 330 may include a strategy registry that stores strategy information necessary to determine a plan corresponding to a voice input. The strategy information may include reference information for determining a single plan when there are a plurality of plans corresponding to the voice input. According to an embodiment, the capsule DB 330 may include a follow up registry that stores the information of the follow-up action for suggesting a follow-up action to the user in the specified context. For example, the follow-up action may include a follow-up utterance. According to an embodiment, the capsule DB 330 may include a layout registry for storing layout information of the information output via the user terminal 200. According to an embodiment, the capsule DB 330 may include a vocabulary registry that stores vocabulary information included in the capsule information. According to an embodiment, the capsule DB 330 may include a dialog registry that stores information about dialog (or interaction) with the user. According to an embodiment, the capsule DB 330 may update the stored object via a developer tool. For example, the developer tool may include a function editor for updating an action object or a concept object. The developer tool may include a vocabulary editor for updating the vocabulary. The developer tool may include a strategy editor that generates and registers a strategy for determining the plan. The developer tool may include a dialog editor that creates a dialog with the user. The developer tool may include a follow up editor capable of activating the follow-up target and editing the follow-up utterance for providing a hint. The follow-up target may be determined based on the currently set target, the preference of the user, or environment condition. The capsule DB 330 according to an embodiment may be also implemented in the user terminal 200.

According to an embodiment, the execution engine 340 may calculate the result, using the generated plan. The end user interface 350 may transmit the calculated result to the user terminal 200. As such, the user terminal 200 may receive the result and may provide the user with the received result. According to an embodiment, the management platform 360 may manage information used by the intelligence server 300. According to an embodiment, the big data platform 370 may collect data of the user. According to an embodiment, the analytic platform 380 may manage the quality of service (QoS) of the intelligence server 300. For example, the analytic platform 380 may manage the component and processing speed (or efficiency) of the intelligence server 300.

According to an embodiment, the service server 400 may provide the user terminal 200 with a specified service (e.g., food order or hotel reservation). According to an embodiment, the service server 400 may be a server operated by the third party. According to an embodiment, the service server 400 may provide the intelligence server 300 with information for generating a plan corresponding to the received voice input. The provided information may be stored in the capsule DB 330. Furthermore, the service server 400 may provide the intelligence server 300 with result information according to the plan.

In the above-described integrated intelligence system 10, the user terminal 200 may provide the user with various intelligence services in response to a user input. The user input may include, for example, an input through a physical button, a touch input, or a voice input.

According to an embodiment, the user terminal 200 may provide a speech recognition service via an intelligence app (or a speech recognition app) stored therein. In this case, for example, the user terminal 200 may recognize the user utterance or the voice input received via the microphone and may provide the user with a service corresponding to the recognized voice input.

According to an embodiment, the user terminal 200 may perform a specified action, based on the received voice input, exclusively, or together with the intelligence server and/or the service server. For example, the user terminal 200 may execute an app corresponding to the received voice input and may perform the specified action via the executed app.

According to an embodiment, when the user terminal 200 provides a service together with the intelligence server 300 and/or the service server, the user terminal may detect a user utterance, using the microphone 220 and may generate a signal (or voice data) corresponding to the detected user utterance. The user terminal may transmit the voice data to the intelligence server 300, using the communication interface 210.

According to an embodiment, the intelligence server 300 may generate a plan for performing a task corresponding to the voice input or the result of performing an action depending on the plan, as the response to the voice input received from the user terminal 200. For example, the plan may include a plurality of actions for performing the task corresponding to the voice input of the user and a plurality of concepts associated with the plurality of actions. The concept may define a parameter to be input for the execution of the plurality of actions or a result value output by the execution of the plurality of actions. The plan may include relationship information between a plurality of actions and a plurality of concepts.

According to an embodiment, the user terminal 200 may receive the response, using the communication interface 210. The user terminal 200 may output the voice signal generated in user terminal 200, to the outside using the speaker 230 or may output an image generated in the user terminal 200, to the outside using the display 240.

Figure 3:
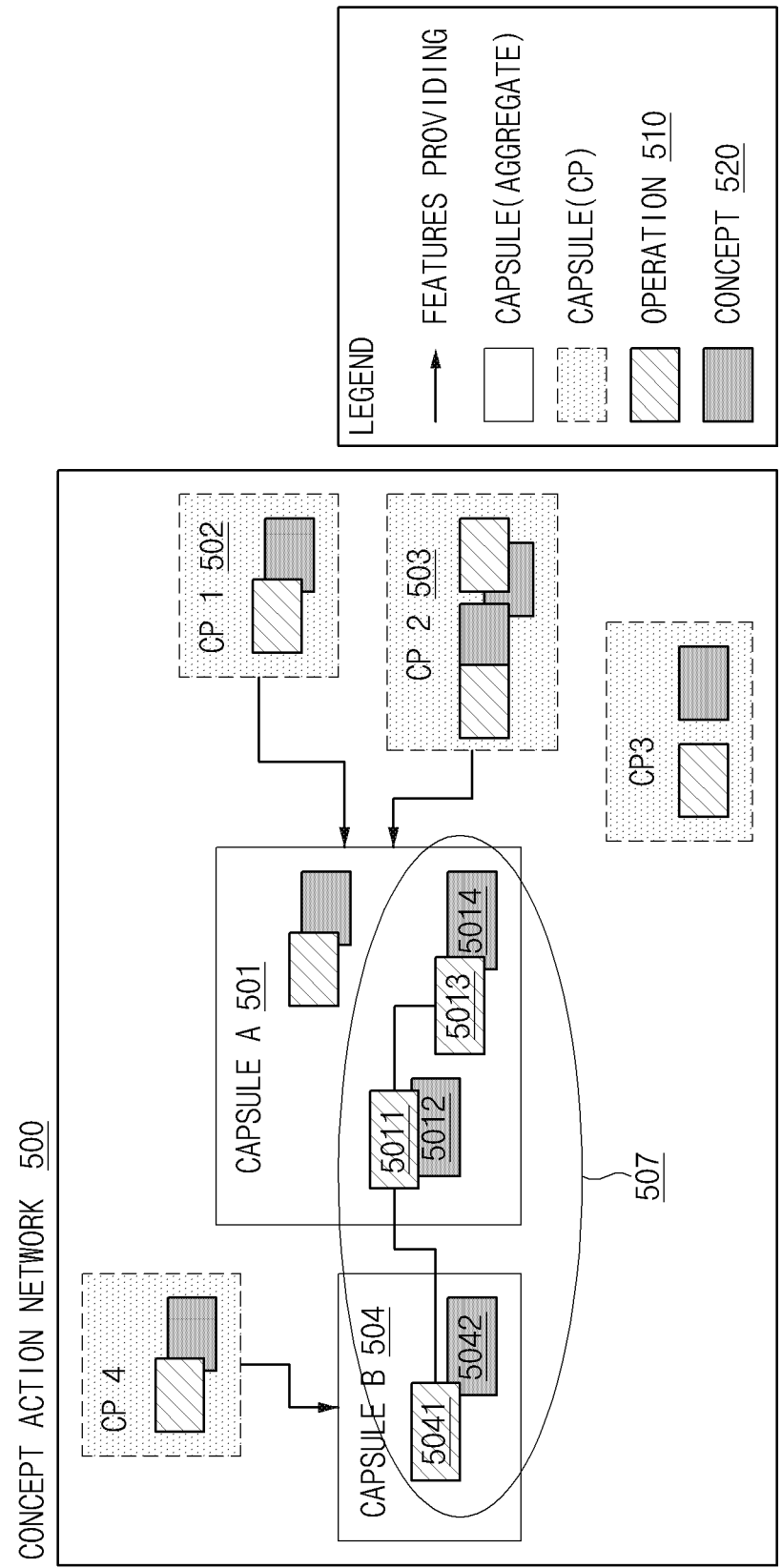
FIG. 3 is a drawing illustrating a form in which relationship information between a concept and an action is stored in a database (DB), according to an embodiment of the disclosure.

FIG. 3 is a diagram illustrating the form in which relationship information between a concept and an action is stored in a database, according to an embodiment of the disclosure.

Referring to FIG. 3, the capsule database (e.g., the capsule DB 330) of the intelligence server 300 may store a plurality of capsules in the form of a concept action network (CAN) 500. The capsule database may store an action for processing a task corresponding to a voice input and a parameter necessary for the action, in the CAN form.

The capsule database may store a plurality of capsules (e.g., capsule A 501 and capsule B 502) respectively corresponding to a plurality of domains (e.g., applications). According to an embodiment, a single capsule (e.g., the capsule A 501) may correspond to one domain (e.g., a location (geo) or an application). Furthermore, the single capsule may correspond to at least one service provider (e.g., CP 1 502 or CP 2 503) for performing the function for the domain associated with the capsule. According to an embodiment, the single capsule may include at least one or more operations 510 and at least one or more concepts 520 for performing a specified function.

According to an embodiment, the natural language platform 320 may generate a plan for performing a task corresponding to the received voice input, using the capsule stored in the capsule database. For example, the planner module 325 of the natural language platform may generate a plan, using the capsule stored in the capsule database. For example, a plan 507 may be generated using actions 5011 and 5013 and concepts 5012 and 5014 of the capsule A 501 and an action 5041 and a concept 5042 of the capsule B 504.

Figure 4:
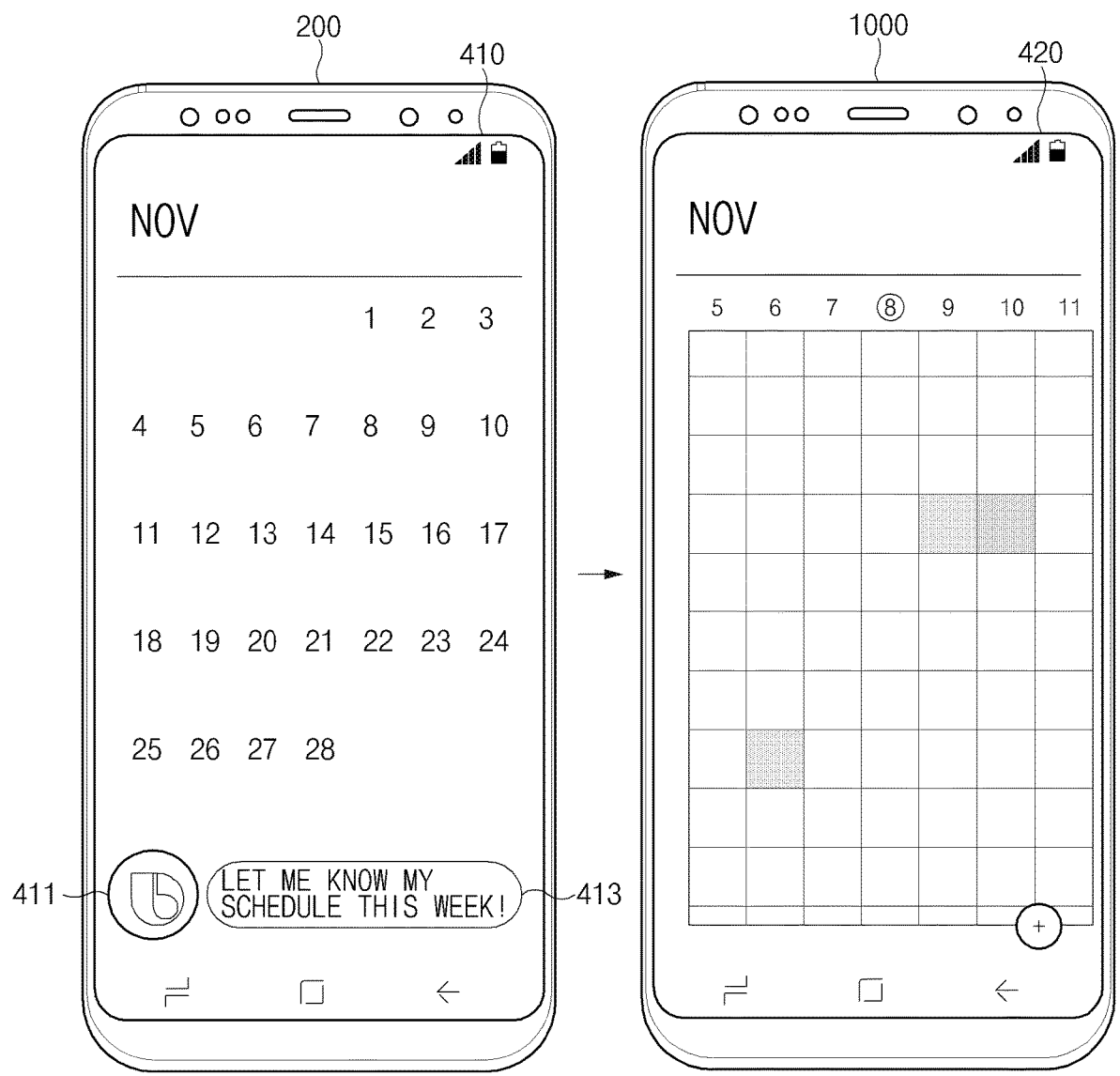
FIG. 4 is a drawing illustrating an electronic device which displays a screen for processing a voice input received via a client module, according to an embodiment of the disclosure.

FIG. 4 is a drawing illustrating a screen in which a user terminal processes a received voice input through an intelligence app, according to an embodiment of the disclosure.

Referring to FIG. 4, the user terminal 200 may execute an intelligence app to process a user input through the intelligence server 300.

According to an embodiment, in screen 410, when recognizing a specified voice input (e.g., wake up!) or receiving an input via a hardware key (e.g., the dedicated hardware key), the user terminal 200 may launch an intelligence app (or an client module) for processing a voice input. For example, the user terminal 200 may launch an intelligence app in a state in which a schedule app is being executed. According to an embodiment, the user terminal 200 may display an object (e.g., an icon) 411 corresponding to the intelligence app, in the display 240. According to an embodiment, the user terminal 200 may receive a voice input by a user utterance. For example, the user terminal 200 may receive a voice input saying that "Let me know my schedule of this week!" According to an embodiment, the user terminal 200 may display a user interface (UI) 413 (e.g., an input window) of an intelligence app, in which text data of the received voice input is displayed, in a display According to an embodiment, in screen 420, the user terminal 200 may display the result corresponding to the received voice input, in the display. For example, the user terminal 200 may receive the plan corresponding to the received user input and may display 'this schedule of this week' in the display depending on the plan.

Figure 5:
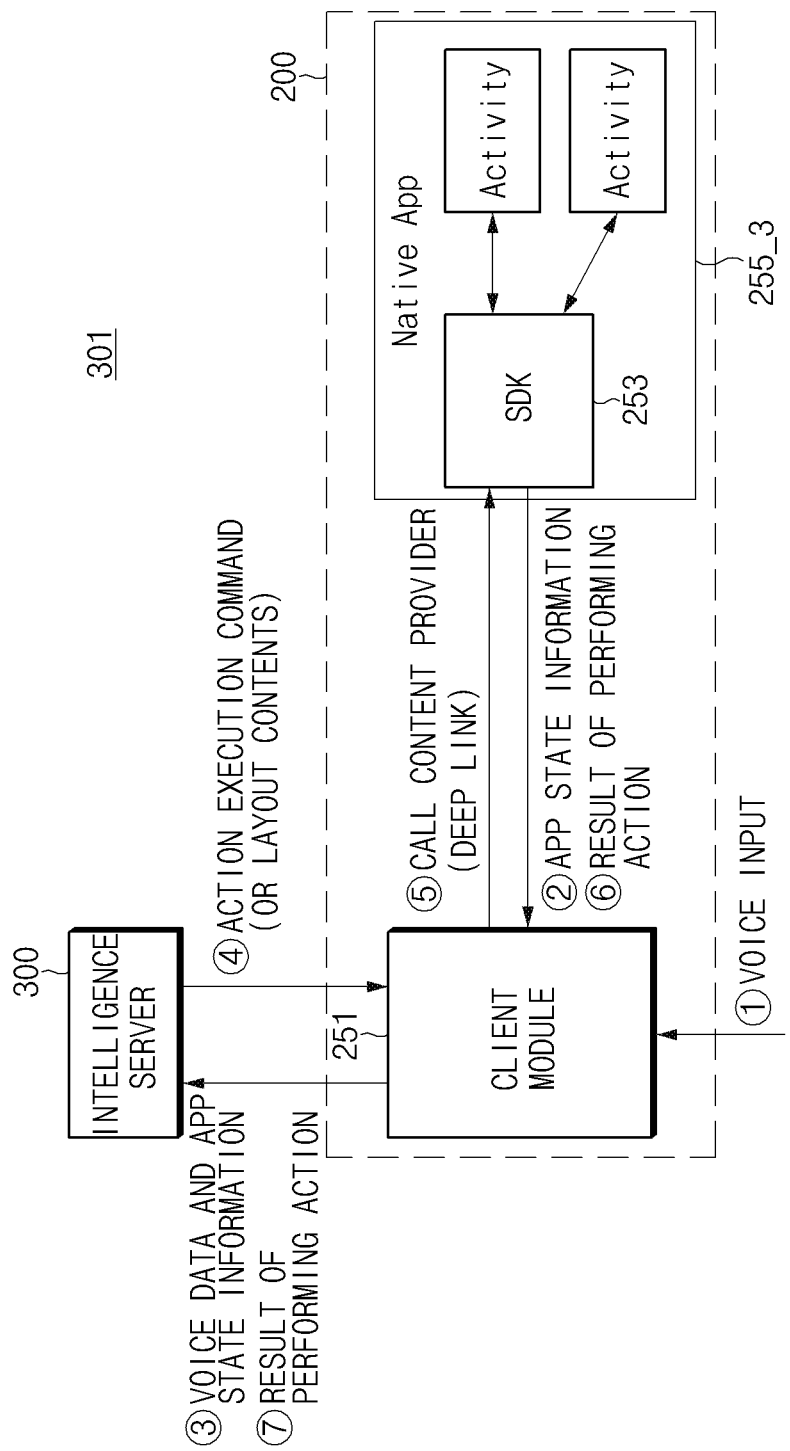
FIG. 5 is a drawing illustrating an interface between an intelligence server (e.g., an intelligence server 300 of FIG. 2), a client module (e.g., a client module 251 of FIG. 2), and an software development kit (SDK) (e.g., an SDK 253 of FIG. 2) according to an embodiment of the disclosure.

FIG. 5 is a drawing illustrating an interface between an intelligence server (e.g., an intelligence server 300 of FIG. 2), a client module (e.g., a client module 251 of FIG. 2), and an SDK (e.g., an SDK 253 of FIG. 2) according to an embodiment of the disclosure.

Referring to FIG. 5, and the illustrated interface 301, according to an embodiment, an application 255_3 which supports a capsule in a user terminal 200 (e.g., a user terminal 200 of FIG. 2) may include an SDK 253. The SDK 253 may support interaction between the application 255_3 and a client module 251. For example, the SDK 253 may share state information of the application 255_3 or may execute an operation of the application 255_3 depending on an action execution command received from an intelligence server 300. According to various embodiments, the SDK 253 may be disposed between the application 255_3 and the client module 251.

The client module 251 may support interaction (including a UI) between the user terminal 200 and the intelligence server 300. For example, when receiving a voice input by a user utterance, the client module 251 may transmit the received voice input to the intelligence server 300 and may display layout contents received from the intelligence server 300. For another example, when receiving a voice input (①), the client module 251 may transmit a request associated with state information of the application 255_3 to the SDK 253 of the application 255_3. The SDK 253 may receive the state information of the application 255_3 in response to the request associated with the state information and may transmit the received state information to the client module 251 (②). When receiving the state information of the application 255_3, the client module 251 may transmit the received state information of the application 255_3 together with a voice input by a user utterance to the intelligence server 300 (③).

The intelligence server 300 may generate the product of performing a plane corresponding to the received voice input and may transmit the product to the client module 251 of the user terminal (④). When a deep link is included in the received product, the client module 251 may transmit the deep link to the SDK 253 of the application 255_3 (⑤). The SDK 253 may perform a specific operation of the application 255_3 using the received deep link and may transmit the result of performing the specific operation to the client module 251 (⑥). The client module 251 may transmit the result of performing the specific operation to the intelligence server 300 (⑦).

Figure 6:
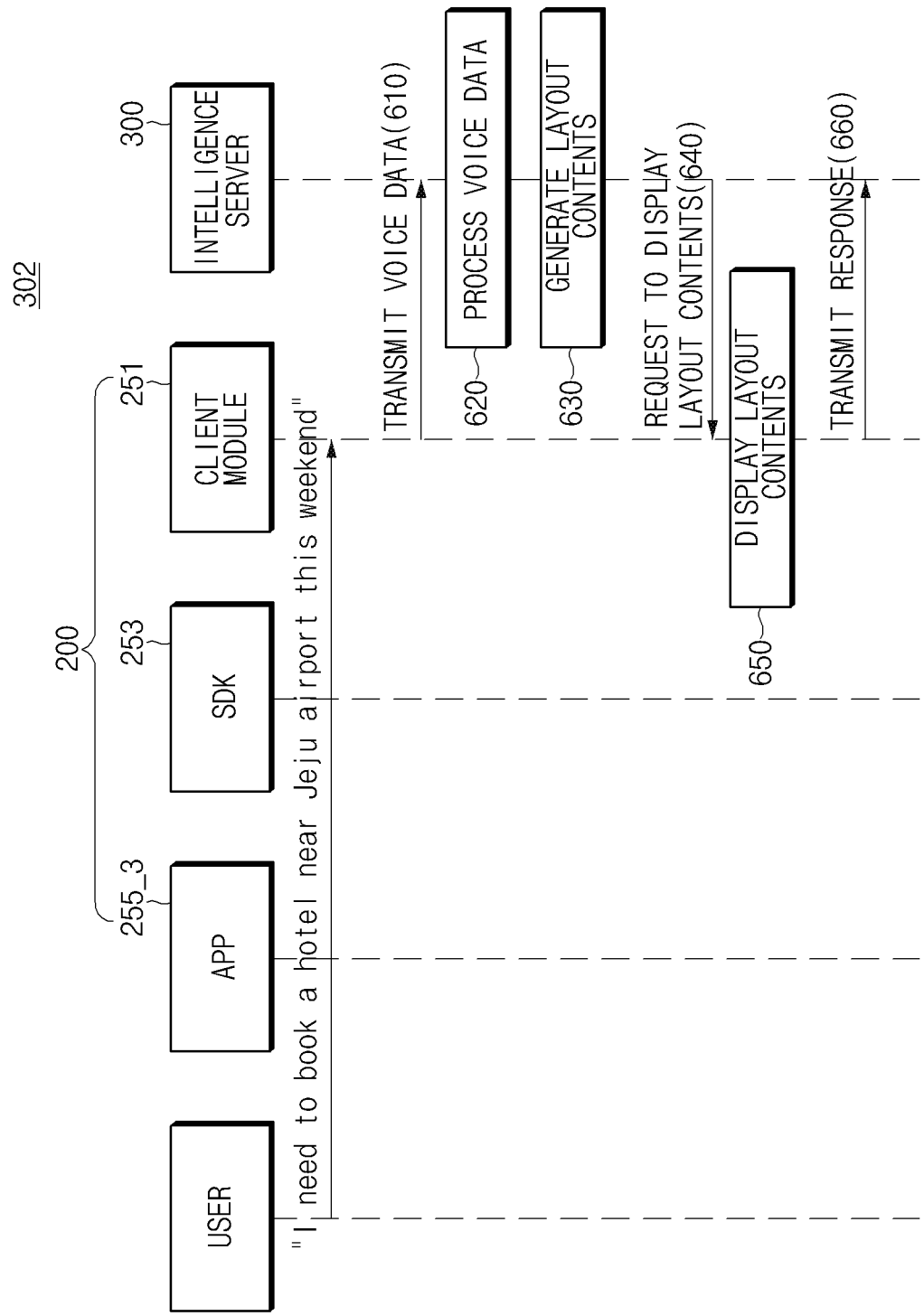
FIG. 6 is a signal sequence diagram illustrating signal flow among an application, an SDK, a client module, and an intelligence server in a processing sequence according to an embodiment of the disclosure.

FIG. 6 is a signal sequence diagram illustrating signal flow among an application, an SDK, a client module, and an intelligence server in a processing sequence according to an embodiment of the disclosure.

FIG. 7 is a drawing illustrating an embodiment of displaying content received from an intelligence server on a screen at an electronic device according to an embodiment of the disclosure.

Referring to FIGS. 6 and 7, in response to a voice input of a user, a client module 251 (e.g., a client module 251 of FIG. 2) may display a result image corresponding to the voice input using only information (layout contents) received from an intelligence server 300 (e.g., an intelligence server 300 of FIG. 2).

In operation 610 of processing sequence 302, when receiving the voice input "I need to book a hotel near Jeju airport this weekend" depending on a user utterance, the client module 251 may convert the received voice input into voice data and may transmit the converted voice data to the intelligence server 300.

In operation 620, the intelligence server 300 may convert the voice data into text using an ASR module (e.g., an ASR module 321 of FIG. 2) and may generate the intent "find hotel" using an NLU module (e.g., an NLU module 323 of FIG. 2) based on the converted text, and may generate a plan including the goal concept "AvailableHotel" using a planner module (e.g., a planner module 325 of FIG. 2) based on the generated intent. In this case, the goal concept may be generated through a hotel capsule generated by a 3' party app, based on, for example, location information "Jeju airport" and time information "this weekend".

In operation 630, the intelligence server 300 may perform a plan using an execution engine (e.g., an execution engine 340 of FIG. 2) and may generate layout contents (e.g., an html format) using the product of performing the plan. The layout contents may be configured with, for example, a dialog and a layout.

In operation 640, the intelligence server 300 may transmit a content display request including the layout contents to the client module 251 of the user terminal 200.

In operation 650, the client module 251 may display the layout contents on a screen 700 of FIG. 7.

In operation 660, the client module 251 may respond to the intelligence server 300 using the result of displaying the layout contents.

Figure 8:
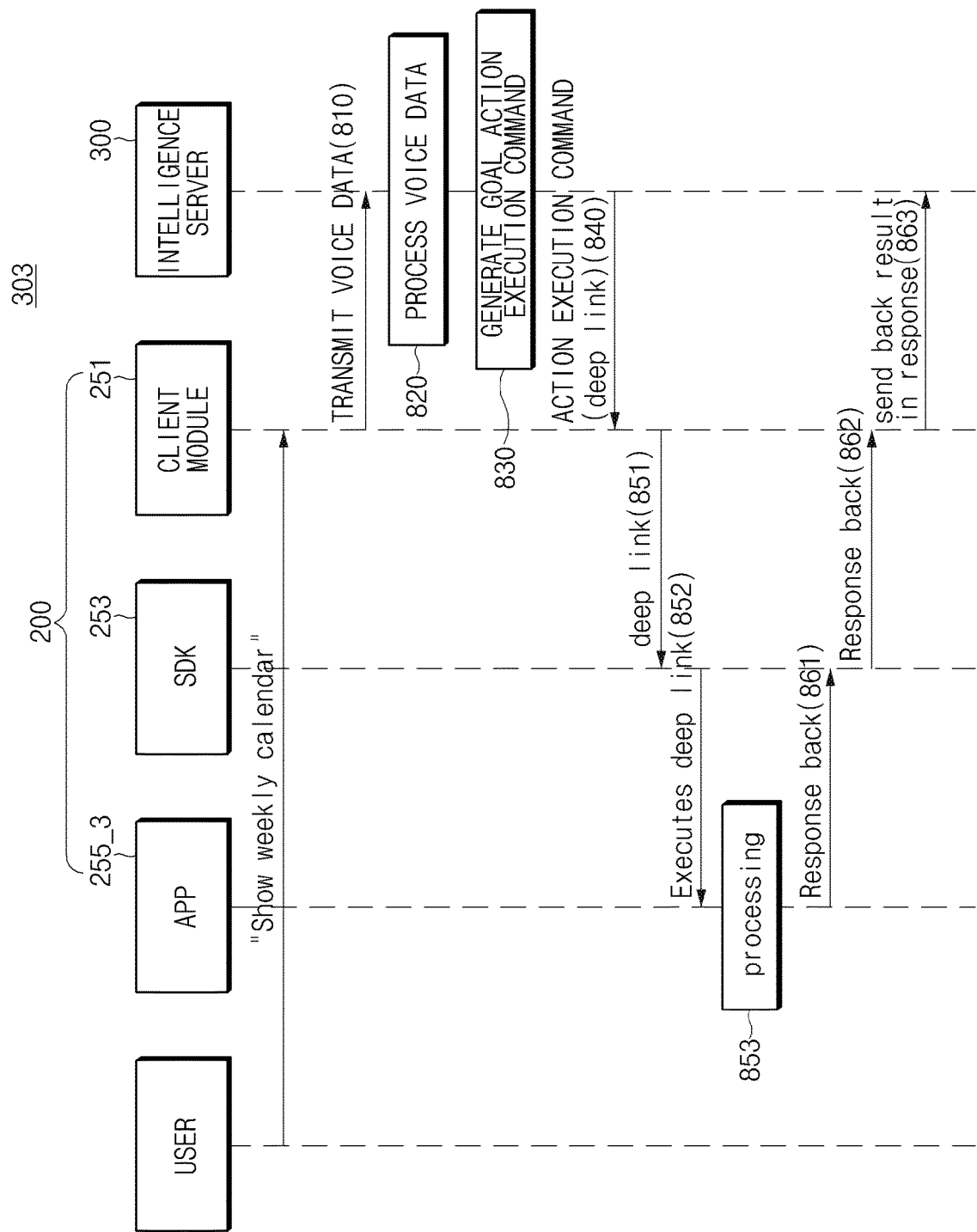
FIG. 8 is a signal sequence diagram illustrating signal flow among an application, an SDK, a client module, and an intelligence server in a processing sequence according to an embodiment of the disclosure.

FIG. 8 is a signal sequence diagram illustrating signal flow among an application, an SDK, a client module, and an intelligence server in a processing sequence according to an embodiment of the disclosure.

Figure 9:
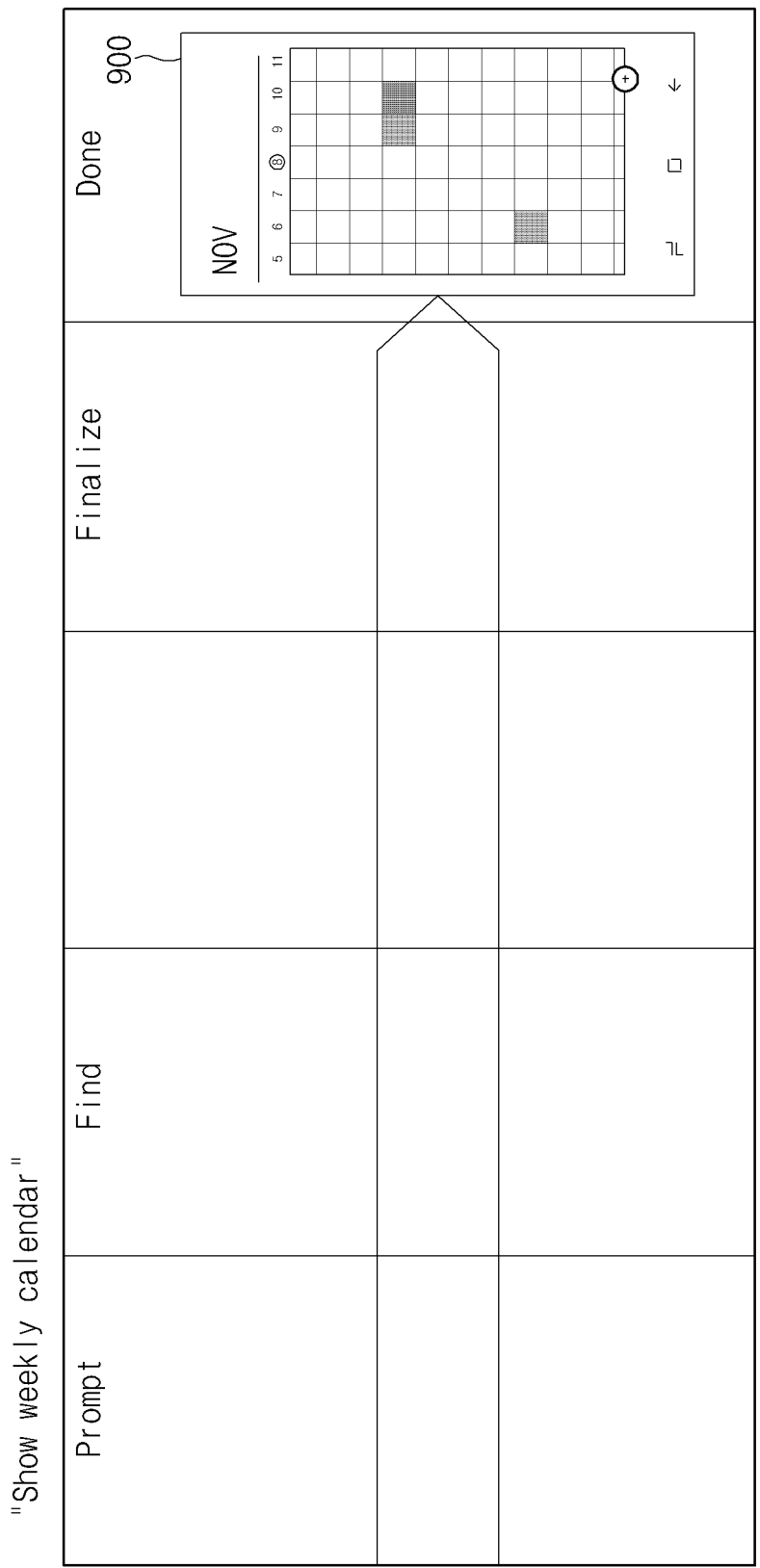
FIG. 9 is a drawing illustrating an embodiment of executing an application depending on information received from an intelligence server and configuring a screen at an electronic device according to an embodiment of the disclosure.

FIG. 9 is a drawing illustrating an embodiment of executing an application depending on information received from an intelligence server and configuring a screen at an electronic device according to an embodiment of the disclosure.

Referring to FIGS. 8 and 9, in response to a voice input of a user, a user terminal 200 (e.g., a user terminal 200 of FIG. 2) may display a result image corresponding to the voice input depending on executing a specific function of an application based on information (a plan) received from an intelligence server 300 (e.g., an intelligence server 300 of FIG. 2).

When receiving the voice input "Show weekly calendar" depending on a user utterance, in operation 810 of processing sequence 303, a client module 251 may convert the received voice input into voice data and may transmit the converted voice data to the intelligence server 300.

In operation 820, the intelligence server 300 may convert the voice data into text using an ASR module (e.g., an ASR module 321 of FIG. 2), may generate the intent "execute weekly calendar" and a parameter using an NLU module (e.g., an NLU module 323 of FIG. 2) based on the converted text, and may generate a plan including the goal action "LaunchCalendar" based on the generated intent and parameter using a planner module (e.g., a planner module 325 of FIG. 2). The goal action "LaunchCalendar" may be a deep link including calling of a content provider (or a specific function) of the user terminal 200, and a parameter necessary to perform "LaunchCalendar" may be "weekly".

In operation 830, the intelligence server 300 may execute the plan using an execution engine (e.g., an execution engine 340 of FIG. 2) to generate a goal action execution command including a deep link as the product of performing the plan.

In operation 840, the intelligence server 300 may transmit the goal action execution command including the deep link to the user terminal 200.

In operation 851, the client module 251 may provide the deep link to an SDK 253 corresponding to the goal action execution command. For example, the client module 251 may identify the SDK 253 to provide the deep link based on the goal action execution command and may provide the deep link to the identified SDK 253.

In operations 852 and 853, the SDK 253 may execute the deep link to execute "Weekly Calendar" of an application 255_3 and may display a screen 900 of FIG. 9 on the "Weekly Calendar".

In operations 861 to 863, the client module 251 may identify the result of executing the goal action at the application 255_3 using the SDK 253 and may transmit the result of performing the goal action to the intelligence server 300.

Figure 10:
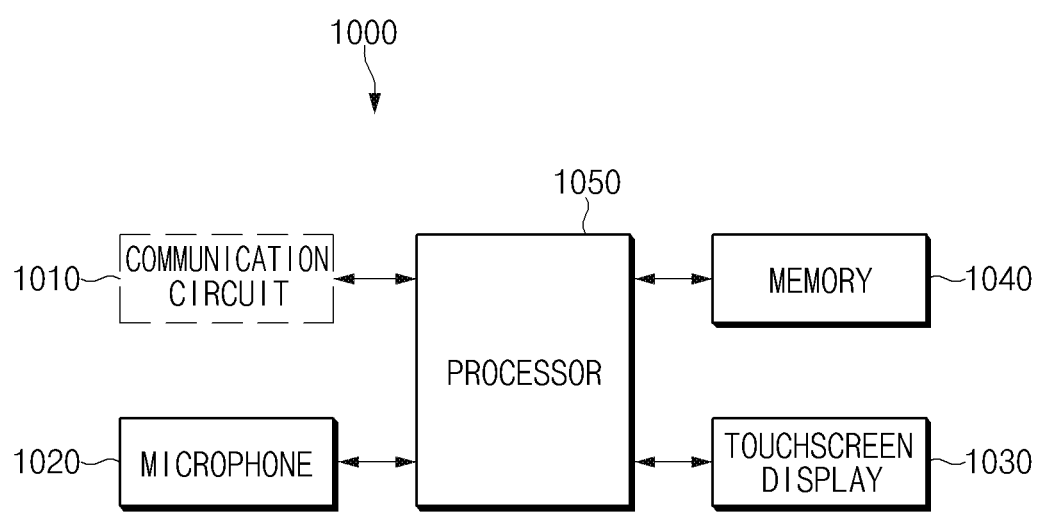
FIG. 10 is a block diagram illustrating a configuration of an electronic device according to an embodiment of the disclosure.

FIG. 10 is a block diagram illustrating a configuration of an electronic device according to an embodiment of the disclosure.

Figure 11:
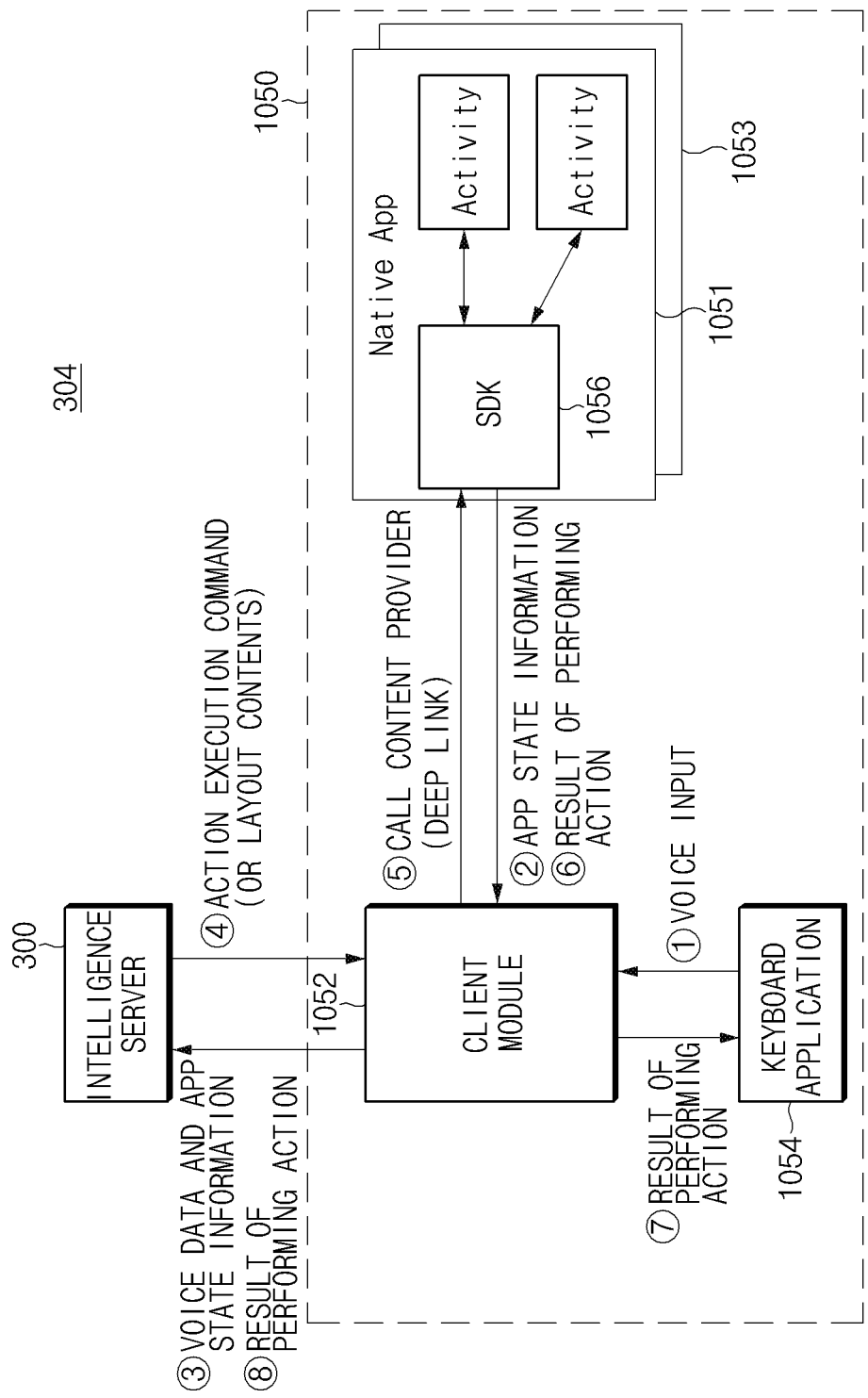
FIG. 11 is a drawing illustrating a detailed configuration of a processor according to an embodiment of the disclosure.

FIG. 11 is a drawing illustrating a detailed configuration of a processor according to an embodiment of the disclosure.

Referring to FIGS. 10 and 11, (including detailed configuration 304), an electronic device 1000 (e.g., a user terminal 200 of FIG. 2) may include a microphone 1020 (e.g., a microphone 220 of FIG. 2), a touchscreen display 1030 (e.g., a display 240 of FIG. 2), a memory 1040 (e.g., a memory 250 of FIG. 2), and a processor 1050 (e.g., a processor 260 of FIG. 2). In an embodiment, the electronic device 1000 may exclude some components or may further include an additional component. For example, the electronic device 1000 may further include a communication circuitry 1010. In an embodiment, some of the components of the electronic device 1000 may be combined into one entity to perform functions of the components before the combination in the same manner.

The communication circuitry 1010 may establish a communication channel for communicating with an intelligence server 300 (e.g., an intelligence server 300 of FIG. 2). The communication channel may include, for example, a communication channel of wireless fidelity (WiFi), Wireless Broadband (WiBro), $3^{rd}$ generation (3G), long term evolution (LTE), or 5th generation (5G) communication scheme.

The microphone 1020 may receive a voice input according to an utterance of a user. The microphone 1020 may include one microphone or a plurality of microphones.

The touchscreen display 1030 may display, for example, a variety of content (e.g., a text, an image, a video, an icon, a system, and/or the like). The touchscreen display 1030 may include, for example, a liquid crystal display (LCD), a light-emitting diode (LED) display, an organic LED (OLED) display, or an electronic paper display. The touchscreen display 1030 may be a thing in which a touch sensor and a display are combined.

The memory 1040 may store, for example, commands or data associated with at least one other component of the electronic device 1000. The memory 1040 may be a volatile memory (e.g., a random access memory (RAM) or the like), a non-volatile memory (e.g., a read-only memory (ROM), a flash memory, or the like), or a combination thereof. The memory 1040 may store instructions causing the processor 1050 to display a virtual keyboard including a first icon, in response to a text input request associated with a first application 1051, while the first application 1051 is running, execute a client module 1052 (e.g., a client module 251 of FIG. 2) associated with a second application (an intelligence app) different from the first application 1051, based on an input to the first icon, when identifying a text entered through the virtual keyboard or a voice input received via the microphone 1020, determine an operation corresponding to the entered text or the received voice input, based on the entered text or the voice input using the client module 1052, and display a result image according to the operation on at least one region between a first region on which the virtual keyboard is displayed or a second region on which a screen where the first application 1051 is running is displayed. The first icon may be associated with executing (enabling) the second application associated with, for example, the client module 1052. The first icon may include at least one of, for another example, an image or a text corresponding to an icon for running the second application.

The processor 1050 may execute calculation or data processing about control and/or communication of at least one other component of the electronic device 1000 based on the instructions stored in the memory 1040. The processor 1050 may include at least one of, for example, a central processing unit (CPU), a graphics processing unit (GPU), a microprocessor, an application processor, an application specific integrated circuit (ASIC), or field programmable gate arrays (FPGA) and may have a plurality of cores.

According to an embodiment, the processor 1050 may display a virtual keyboard including the first icon using a keyboard application 1054, in response to a request associated with a text input to the first application 1051, while the first application 1051 which is a foreground application is running. The first application 1051 may be, an application, for example, a chat application, an e-mail application, or a web browser, accompanying a text input. The request associated with the text input may include, for example, a selection (e.g., a touch) for a (text) input window of the first application 1051.

According to an embodiment, the processor 1050 may convert a current mode into a speech recognition mode or a text input mode associated with the second application, based on an input to the first icon. The processor 1050 may transmit a text or voice input, which is input using the client module 1052, to the intelligence server 300 in the speech recognition mode or the text input mode.

According to an embodiment, when identifying a first type of touch input (e.g., a long press) to the first icon, the processor 1050 may enable the microphone 1020 and the client module 1052 and may convert the current mode into a speed recognition mode associated with the second application. The processor 1050 may convert a voice input received via the microphone 1020 in the speed recognition mode into voice data using the client module 1052 and may transmit the voice data to the intelligence server 300 via the communication circuitry 1010. In contrast, the processor 1050 may convert voice data into text and may transmit the text to the intelligence server 300. As such, the processor 1050 may transmit and receive data with the intelligence server 300 via the communication circuitry 1010, but, for convenience of description in the disclosure below, the description of the communication circuitry 1010 may be omitted. In an embodiment, when receiving text corresponding to voice data from the intelligence server 300, the processor 1050 may display the received text. In an embodiment, the processor 1050 may display an object associated with the speech recognition mode in the speed recognition mode. The object associated with the speech recognition mode may be, for example, a dynamic object in which an animation effect (e.g., a plurality of concentric indications) emphasizing the first icon is applied to the periphery of the first icon.

According to an embodiment, when identifying a second type of touch input (e.g., a short press) to the first icon, the processor 1050 may enable the client module 1052 to operate in a text input mode associated with the second application. The processor 1050 may display, for example, a text input field close to an input window of the first application 1051 (e.g., an upper portion of the input window) in the text input mode. For example, the processor 1050 may display a text input field (e.g., a text input field 1825 of FIG. 18) to be overlaid with at least a portion of an input window (e.g., an input window 1811*a* of FIG. 18) of a chat application without being overlapped with a region including a key of a virtual keyboard. The processor 1050 may transmit a text entered into the text input field to the intelligence server 300 via the client module 1052. For example, when an icon (e.g., a send key) associated with the text input field is selected, when the text input is stopped during a second specified time after the text is entered into the text input field, or when a specified sign (e.g., a period or a question mark) is entered into the text input field, the processor 1050 may transmit the text entered into the text input field to the intelligence server 300. For another example, the client module 1052 may transmit all of texts entered into the text input field to the intelligence server 300. In an embodiment, the processor 1050 may fail to transmit the text entered into the text input field to the first application 1051. In an embodiment, after displaying the text input field, when receiving a request associated with ending the displaying of the text input field, the processor 1050 may end the text input mode and may fail to display the text input field.

According to an embodiment, when obtaining the product of voice data or text received from the intelligence server 300, the processor 1050 may display a result image on at least one region between a first region on which a virtual keyboard of the touchscreen display 1030 is displayed or a second region on which a screen where the first application 1051 is running is displayed, based on the product. The product may include at least one of, for example, layout contents or an action execution command. For example, the client module 1052 may receive layout contents (e.g., JSON or HTML format) from the intelligence server 300 and may deliver the layout contents to the keyboard application 1054. The processor 1050 may convert the layout contents into a specified format of result image using the keyboard application 1054 and may display the specified format of result image on the at least one region of the touchscreen display 1030. The result image may include at least one of a text, an image, or link information (e.g., a URL). For another example, when receiving an action execution command including a deep link from the intelligence server 300, as the processor 1050 executes the deep link based on the action execution command using the client module 1052 and an SDK 1056 (e.g., an SDK 253 of FIG. 2), it may generate layout contents corresponding to the action execution command using a third application 1053. The third application 1053 may be a background application. The processor 1050 may convert the generated contents into a specified format of result image and may display the specified format of result image on the at least one region of the touchscreen display 1030.

According to an embodiment, the processor 1050 may highlight a result image corresponding to a voice input or an entered text. For example, the processor 1050 may display a region on which a result image of the touchscreen display 1030 is displayed at a first luminance and may display the remaining region at a second luminance less than the first luminance.

According to an embodiment, when information included in the result image is selected, the processor 1050 may determine the selected information as information which is entered in an input window of the first application 1051 and may display the selected information on a screen where the first application 1051 is running. For example, the processor 1050 may display a result image including a plurality of restaurant information in response to the user utterance "find a fine restaurant near here", while a chat application is running. When one of the plurality of restaurant information is selected, the processor 1050 may determine the selected restaurant information as information which is entered in an input window of the first application 1051 and may display the selected restaurant information on a chat window of the chat application.

According to various embodiments, when a text monitoring function associated with the client module 1052 is set, the processor 1050 may monitor texts which are entered in the input window of the first application 1051 and may operate in a text monitoring mode for providing a result image corresponding to at least some of the texts. The text monitoring function may be set through, for example, the second application associated with the client module 1052. For example, when receiving a request associated with transmitting texts which are entered through a virtual keyboard displayed while the first application 1051 is running, the processor 1050 may transmit the entered text to the first application 1051 and the client module 1052. The processor 1050 may transmit a sentence including a trigger word stored in the memory 1040 among texts entered through the client module 1052 to the intelligence server 300. The trigger word may include at least one of, for example, a phrase for requesting at least one of a plurality of operations executable by the electronic device 1000, a specified sign (e.g., a question mark), a specified topic change word (e.g., so), or a word (e.g., search) associated with requesting a specified operation. On the other hand, the processor 1050 may transmit all entered texts to the intelligence server 300, for example, in units of sentences. The intelligence server 300 may generate a plan corresponding to an intent of a user based on text received through an NLU module (e.g., an NLU module 323 of FIG. 2) and may execute the plan using an execution engine (e.g., an execution engine 340 of FIG. 2) to generate the product. The processor 1050 may receive the product from the intelligence server 300 and may display a result image on the at least one region of the touchscreen display 1030 based on the product.

According to the above-mentioned embodiment, the electronic device 1000 may fail to stop executing the first application 1051 which is running (e.g., change its state using a background application), may perform an operation of the intelligence server 300 or the third application 1053 using the second application (e.g., an intelligence app), thus providing a result image according to the operation.

Furthermore, according to the above-mentioned embodiment, the electronic device 1000 may display a result image in the same frame as a virtual keyboard associated with the first application 1051 and a screen where the first application 1051 is running, thus enhancing user visibility of using a function.

In addition, according to the above-mentioned embodiment, the electronic device 1000 may perform a specified function of the third application 1053 corresponding to the entered text as well as a voice input, while the first application 1051 is running.

Figure 12:
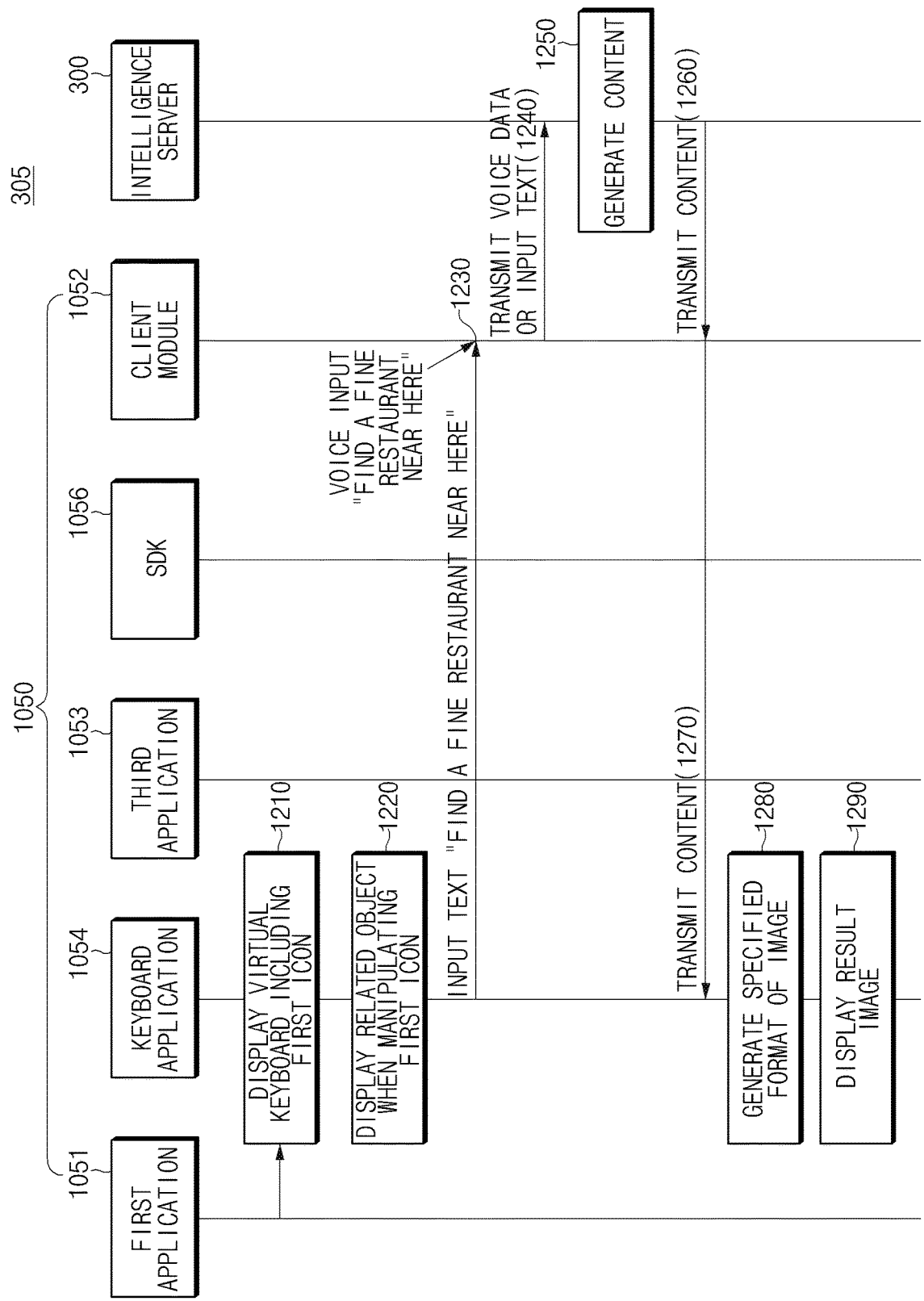
FIG. 12 is a signal sequence diagram illustrating a method for displaying a result image when an electronic device receives layout contents (the product) in a processing sequence according to an embodiment of the disclosure.

FIG. 12 is a signal sequence diagram illustrating a method for displaying a result image when an electronic device receives layout contents (the product) in a processing sequence according to an embodiment of the disclosure.

Referring to FIG. 12, including processing sequence 305, when obtaining content (the product) corresponding to a voice input or an entered text, a client module 1052 may display a result image corresponding to the content using a keyboard application 1054.

In operation 1210, the keyboard application 1054 may display a virtual keyboard including a first icon, in response to a request associated with displaying a keyboard, received from a first application 1051. The request associated with displaying the keyboard may be, for example, a result of detecting that an input window of the first application 1051 is selected, which is delivered from the first application 1051 to the keyboard application 1054.

In operation 1220, the keyboard application 1054 may convert a current mode into a speech recognition mode or a text input mode in response to manipulating the first icon and may display an object associated with each mode. For example, the keyboard application 1054 may convert the current mode into the speed recognition mode in response to a second type of touch on the first icon and may display an object associated with the speech recognition mode. Alternatively, the keyboard application 1054 may convert the current mode into the text input mode in response to a first type of touch on the first icon and may display a text input field. The keyboard application 1054 may transmit a request for conversion into the speech recognition mode or the text input mode to a client module 1052.

In operation 1230, the client module 1052 may identify a voice input received via a microphone (e.g., a microphone 1020 of FIG. 10) or a text entered through a virtual keyboard. For example, the client module 1052 may enable the microphone 1020 in the speech recognition module and may receive a voice input via the microphone 1020. For another example, the client module 1052 may receive a text entered into the text input field from the keyboard application 1054 in the text input mode. In operation 1240, the client module 1052 may convert the voice input into voice data. For example, the voice data or the text, such as "find a fine restaurant near here", may be to generate content by only an operation of an intelligence server 300.

In operation 1240, the client module 1052 may transmit the voice data or the text to the intelligence server 300.

In operation 1250, the intelligence server 300 may convert the received voice data into text using an ASR module (e.g., an ASR module 321 of FIG. 2). The intelligence server 300 may generate the intent "find a fine restaurant near here" based on the converted or received text using an NLU module (e.g., an NLU module 323 of FIG. 2) and may generate a plan including a goal concept associated with "a fine restaurant near here" based on the generated intent using a planner module (e.g., a planner module 325 of FIG. 2). The intelligence server 300 may perform the plan using an execution engine (e.g., an execution engine 340 of FIG. 2) and may generate layout contents (e.g., html or JSON format) as the product of performing the plan. The layout contents may be an image including at least one of, for example, link information associated with "a fine restaurant near here", image information indicating "a fine restaurant near here", and text information describing "a fine restaurant near here".

In operation 1260, the intelligence server 300 may transmit the generated layout contents to the client module 1052 of an electronic device 1000.

In operation 1270, the client module 1052 may receive the layout contents and may transmit the received layout contents to the keyboard application 1054.

In operation 1280, when receiving the contents, the keyboard application 1054 may generate a specified format of image to be entered in an input window of the first application 1051, based on the received contents.

In operation 1290, the keyboard application 1054 may display the specified format of image on at least one region between a first region on which a virtual keyboard is displayed or a second region on which a screen where the first application 1051 is running is displayed.

Figure 13:
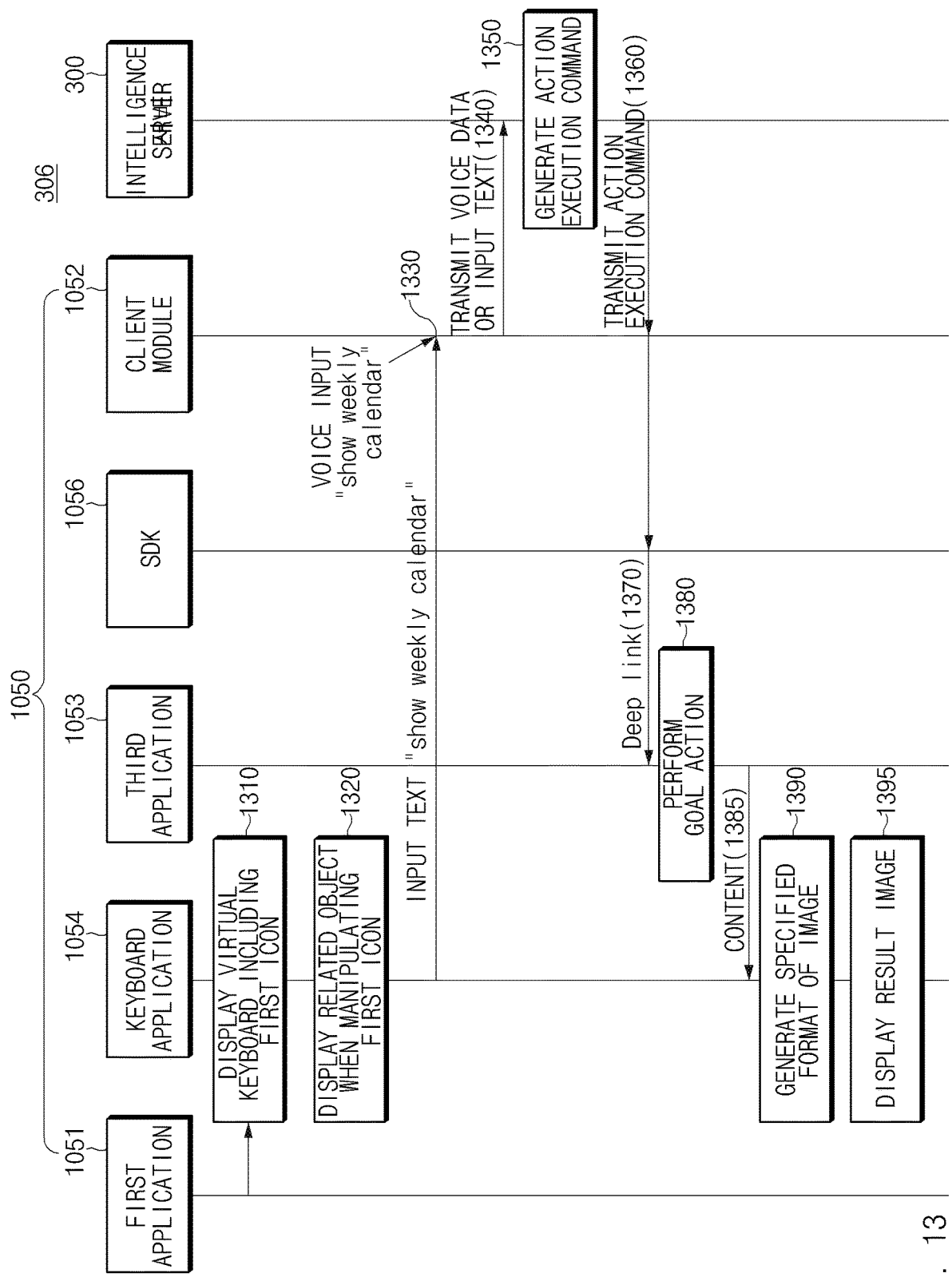
FIG. 13 is a signal sequence diagram illustrating a method for displaying a result image when an electronic device receives an action execution command (the product) in a processing sequence according to an embodiment of the disclosure.

FIG. 13 is a signal sequence diagram illustrating a method for displaying a result image when an electronic device receives an action execution command (the product) in a processing sequence according to an embodiment of the disclosure.

Referring to FIG. 13, including processing sequence 306, because operations 1310 to 1340 are the same or similar to the above-mentioned operations 1210 to 1240, the description associated with the same will be omitted. Herein, a voice input received or a text entered in operation 1330 may be associated with an action, such as "show weekly calendar", accompanying execution of a third application 1053 installed in an electronic device 1000.

In operation 1350, an intelligence server 300 may convert the received voice into text using an ASR module (e.g., an ASR module 321 of FIG. 2). The intelligence server 300 may generate the intent "execute weekly calendar" and the parameter "weekly" based on the converted or received text using an NLU module (e.g., an NLU module 323 of FIG. 2) and may generate a plan including the goal action "launchCalendar" based on the generated intent and parameter using a planner module (e.g., a planner module 325 of FIG. 2). The intelligence server 300 may generate a goal action execution command by performing the plan using an execution engine (e.g., an execution engine 340 of FIG. 2). The goal action "launchCalendar" may be a deep link including calling a content provider (a specific function) of the electronic device 1000.

In operation 1360, the intelligence server 300 may transmit the generated goal action execution command to a client module 1052 of the electronic device 1000.

In operation 1370, the client module 1052 may identify an SDK 1056 to provide the deep link based on the goal action execution command and may transmit the deep link to the third application 1053 which is a content provider via the identified SDK 1056.

In operation 1380, the third application 1053 may execute the deep link to perform a goal action. For example, the third application 1053 may execute "Weekly Calendar" depending on the deep link to generate content (e.g., 900 of FIG. 9) through the "Weekly Calendar". Furthermore, after operation 1380, the third application 1053 may transmit the result of performing the goal action to the client module 1052 via the SDK 1056.

In operation 1385, the third application 1053 may deliver the content (e.g., 900 of FIG. 9) generated through the "Weekly Calendar" to a keyboard application 1054.

In operation 1390, the keyboard application 1054 may generate a specified format of image based on the content received from the third application 1053.

In operation 1395, the keyboard application 1054 may display the specified format of image on at least one region between a first region on which a virtual keyboard is displayed or a second region on which a screen where a first application 1051 is running is displayed.

Figure 14:
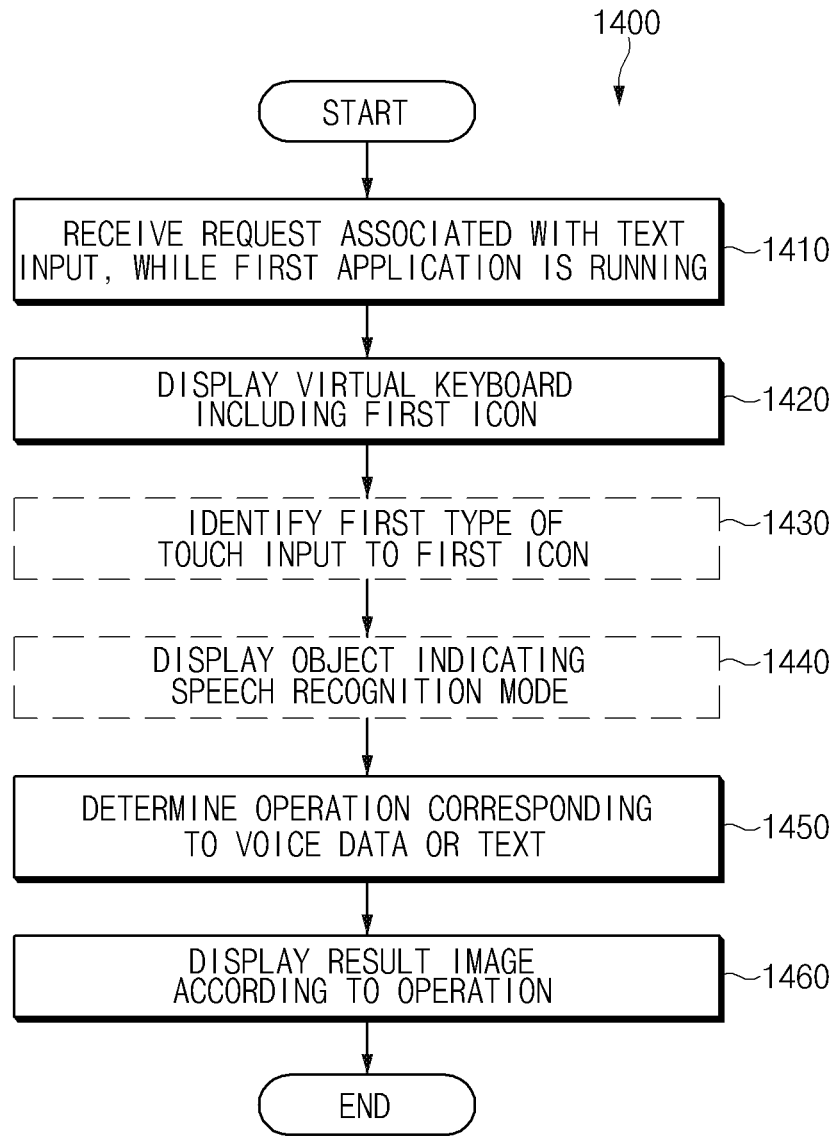
FIG. 14 is a flowchart illustrating a multitasking method in a speed recognition mode of an electronic device according to an embodiment of the disclosure.

FIG. 14 is a flowchart illustrating a multitasking supporting method in a speed recognition mode of an electronic device according to an embodiment of the disclosure. At least one (e.g., operations 1430 and 1440) of operations of FIG. 14 may be omitted.

Referring to FIG. 14, and multitasking supporting method 1400, in operation 1410, while a first application is running, an electronic device (e.g., an electronic device 1000 of FIG. 10) may receive a request associated with a text input to the first application. The request associated with the text input may be that, for example, an input window of the first application is selected (e.g., touched).

In operation 1420, the electronic device 1000 may output a virtual keyboard including a first icon in response to the request associated with the text input. The first icon may be associated with executing (or enabling), for example, a second application associated with a client module (e.g., a client module 1052 of FIG. 11). The first icon may include at least one of, for another example, an image or a text corresponding to an icon for running the second application.

In operation 1430, the electronic device 1000 may identify a first type of touch input to the first icon. The first type of touch input may be, for example, a long press touch in which the first icon is touched over a first specified time.

When identifying the first type of touch input to the first icon, in operation 1440, the electronic device 1000 may convert a current mode into a speech recognition mode and may display an object indicating the speech recognition mode. In operation 1440, the electronic device 1000 may enable a microphone (e.g., a microphone 1020 of FIG. 10) and the client module 1052.

In operation 1450, the electronic device 1000 may determine an operation corresponding to voice data or text. For example, the electronic device 1000 may receive a voice input via the microphone 1020 or may convert the received voice input into voice data. In addition, in operation 1450, a processor (e.g., a processor 1050 of FIG. 10) may convert the voice data into text. Thereafter, the electronic device 1000 may transmit the voice data or the text to an intelligence server (e.g., an intelligence server 300 of FIG. 11) and may receive the product corresponding to voice data or text transmitted from the intelligence server 300. The product may include performance related information corresponding to a voice input.

In operation 1460, the electronic device 1000 may display a result image corresponding to the voice input on a touchscreen display (e.g., a touchscreen display 1030 of FIG. 10) based on the received product. The result image may have a format capable of being entered in an input window of the first application. For example, the electronic device 1000 may display the result image on at least one region between a first region on which a virtual keyboard is displayed or a second region on which a screen where the first application is running is displayed.

According to the above-mentioned embodiment, the electronic device 1000 may perform a specified function (including a function of a second or third application) corresponding to the voice input, while the first application is running.

Figure 15:
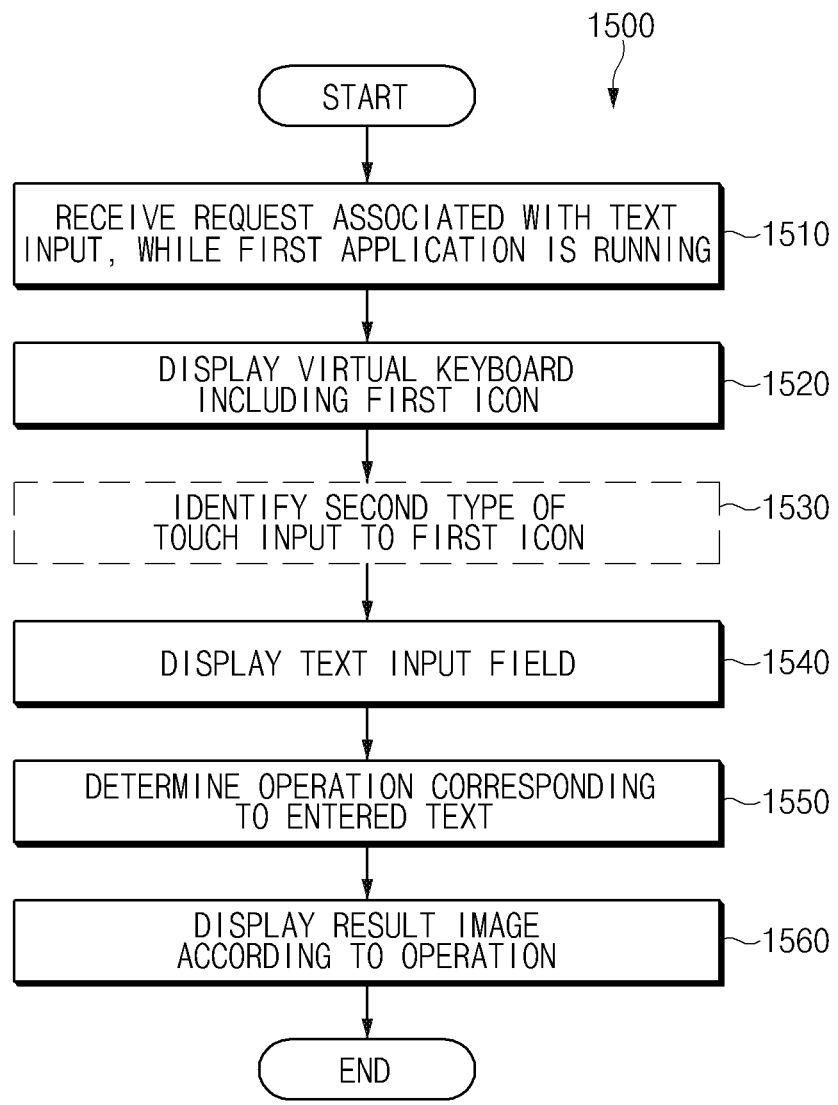
FIG. 15 is a flowchart illustrating a multitasking method in a text input mode of an electronic device according to an embodiment of the disclosure.

FIG. 15 is a flowchart illustrating a multitasking supporting method in a text input mode of an electronic device according to an embodiment of the disclosure. At least one (e.g., operation 1530) of operations of FIG. 15 may be omitted.

Referring to FIG. 15, including multitasking supporting method 1500, in operation 1510, while a first application is running, an electronic device (e.g., an electronic device 1000 of FIG. 10) may receive a request associated with a text input to the first application. The request associated with the text input may be that, for example, an input window of the first application is selected (e.g., touched).

In operation 1520, the electronic device 1000 may output a virtual keyboard including a first icon in response to the request associated with the text input. The first icon may be associated with executing (or enabling), for example, a second application associated with a client module (e.g., a client module 1052 of FIG. 11). The first icon may include at least one of, for another example, an image or a text corresponding to an icon for running the second application.

In operation 1530, the electronic device 1000 may identify a second type of touch input to the first icon. The first type of touch input may be, for example, a short press touch in which the first icon is touched under a first specified time.

In operation 1540, when identifying the second type of touch input to the first icon, the electronic device 1000 may convert a current mode into a text input mode and may display a text input field. In operation 1540, the electronic device 1000 may enable the client module 1052.

In operation 1550, the electronic device 1000 may determine an operation corresponding to a text entered into the text input field. For example, when an icon (e.g., a send key) associated with the text input field is selected, when the text input is stopped during a second specified time after the text is entered into the text input field, or when a specified sign (e.g., a period or a question mark) is entered into the text input field, the electronic device 1000 may transmit the text entered into the text input field to an intelligence server (e.g., an intelligence server 300 of FIG. 11). The electronic device 1000 may receive the product corresponding to the text from the intelligence server 300, in response to the transmitted text. The product may include performance related information corresponding to the text input.

In operation 1560, the electronic device 1000 may display a result image corresponding to the text input on a touchscreen display (e.g., a touchscreen display 1030 of FIG. 10) based on the received product. The result image may have a format capable of being entered in an input window of the first application. For example, the electronic device 1000 may display the result image on at least one region between a first region on which the virtual keyboard is displayed or a second region on which a screen where the first application is running is displayed.

According to the above-mentioned embodiment, the electronic device 1000 may perform a specified function (including a function of the second application or the third application) corresponding to the entered text, while the first application is running.

Figure 16:
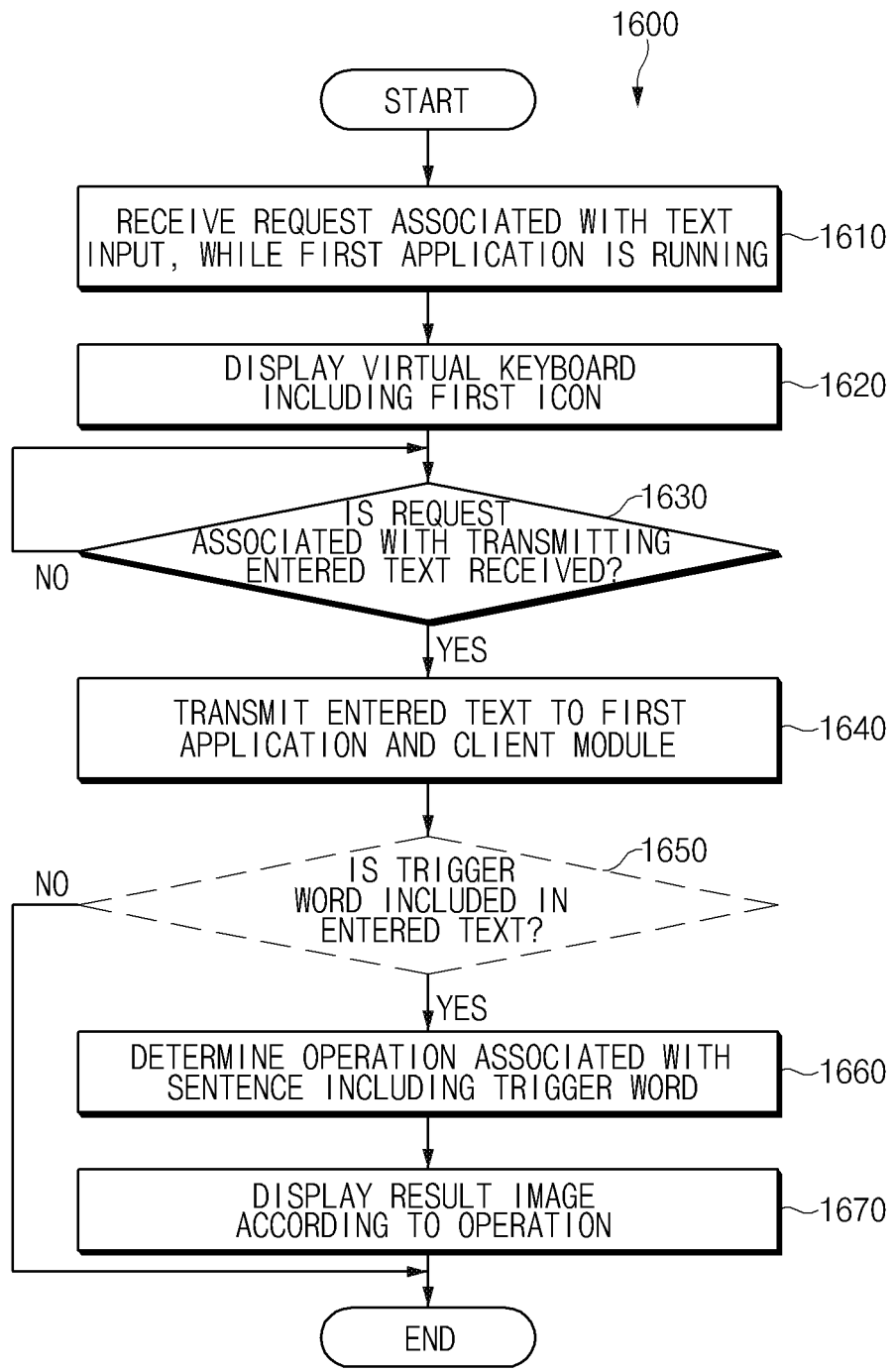
FIG. 16 is a flowchart illustrating a multitasking method in a text monitoring mode of an electronic device according to an embodiment of the disclosure.

FIG. 16 is a flowchart illustrating a multitasking supporting method in a text monitoring mode of an electronic device according to an embodiment of the disclosure. At least one (e.g., operation 1650) of operations of FIG. 16 may be omitted.

Referring to FIG. 16, including multitasking supporting method 1600, an electronic device (e.g., an electronic device 1000 of FIG. 10) may monitor a text entered in an input window of a first application in a text monitoring mode and may display a result image corresponding to at least some of the entered texts.

In operation 1610, while the first application is running, the electronic device 1000 may receive a request associated with a text input to the first application. The request associated with the text input may be that, for example, the input window of the first application is selected (e.g., touched).

In operation 1620, the electronic device 1000 may output a virtual keyboard including a first icon in response to the request associated with the text input. The first icon may be associated with executing (or enabling), for example, a second application associated with a client module (e.g., a client module 1052 of FIG. 11). The first icon may include at least one of, for another example, an image or a text corresponding to an icon for running the second application.

After text is entered in the input window of the first application through the virtual keyboard, in operation 1630, the electronic device 1000 may receive a request associated with transmitting the entered text. The request associated with transmitting the entered text may be that an icon associated with, for example, the input window of the first application is selected. In operation 1630, the electronic device 1000 may wait before receiving the request associated with transmitting the entered text.

When receiving the request associated with transmitting the entered text, the electronic device 1000 may transmit the entered text to the first application and the client module 1052 at operation 1640.

In operation 1650, the electronic device 1000 (e.g., the client module 1052) may detect a sentence (an instruction) including a trigger word among the entered texts. The trigger word may include at least one of, for example, a phrase for requesting at least one of a plurality of operations executable by the electronic device 1000, a specified sign (e.g., a question mark), a specified topic change word (e.g., so), or a word (e.g., search) associated with requesting a specified operation.

In operation 1660, the electronic device 1000 may transmit the sentence including the trigger word to an intelligence server (e.g., an intelligence server 300 of FIG. 11) via a communication circuitry (e.g., a communication circuitry 1010 of FIG. 10) and may receive the product corresponding to the sentence including the trigger word from the intelligence server 300. The product may include performance related information corresponding to a voice input.

In operation 1670, the electronic device 1000 may display a result image corresponding to the text input on a touchscreen display (e.g., a touchscreen display 1030 of FIG. 10) based on the received product. The result image may have a format capable of being entered in an input window of the first application. For example, the electronic device 1000 may display the result image on at least one region between a first region on which the virtual keyboard is displayed or a second region on which a screen where the first application is running is displayed.

According to various embodiments, the electronic device 1000 may transmit all texts entered in the input window of the first application to the intelligence server 300 and may receive the product corresponding to some texts capable of identifying an intent of a user among texts received from the intelligence server 300.

Figure 17:
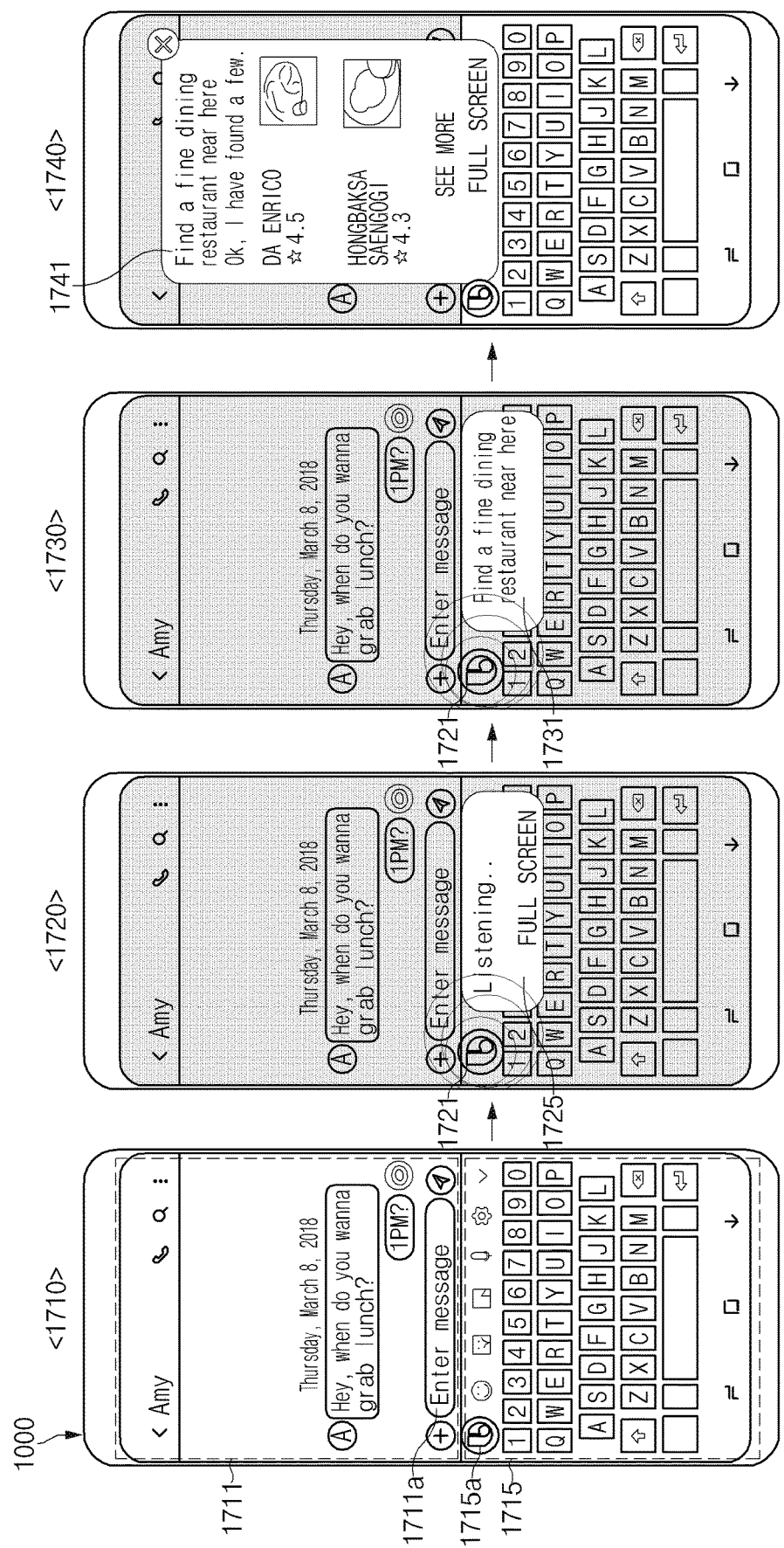
FIG. 17 is a drawing illustrating UI screens for a speech recognition mode of an electronic device according to an embodiment of the disclosure.

FIG. 17 is a drawing illustrating UI screens for a speech recognition mode of an electronic device according to an embodiment of the disclosure.

Referring to FIG. 17, on screen 1710, an electronic device 1000 (e.g., an electronic device 1000 of FIG. 10) may display a screen 1711 where a chat application is running and a virtual keyboard 1715 including a first icon 1715*a*, in response to a selection for an input window 1711*a* of the chat application. When identifying a first type of touch input (e.g., a long press) to the first icon 1715*a*, the electronic device 1000 may convert a current mode into a speech recognition mode.

On screen 1720, the electronic device 1000 may display objects 1721 and 1725 associated with the speech recognition mode. The objects 1721 and 1725 associated with the speech recognition mode may include a dynamic object 1721 to which an animation effect emphasizing the first icon 1715a (e.g., displaying concentric circles, a color of which is gradually brightened as it is away from the center of the first icon 1715a, on the periphery of the first icon 1715a) is applied and a text window object 1725 describing that now is during speech recognition.

On screen 1730, the electronic device 1000 may display a text window object 1731 including text corresponding to a voice input received via a microphone (e.g., a microphone 1020 of FIG. 10). The electronic device 1000 may convert the voice input into text using an ASR module (e.g., an ASR module 321 of FIG. 2) and may display the text.

On screen 1740, the electronic device 1000 may overlap and display a result image 1741 of performance determined based on the text corresponding to the voice input on regions where the virtual keyboard 1715 and the screen 1711 where the chat application (e.g., a first application 1051 of FIG. 11 or 12) is running are displayed.

In the above-mentioned embodiment, the electronic device 1000 may highlight an image associated with the speech recognition mode. For example, on screens 1720 and 1730, the electronic device 1000 may display a region including the objects 1721 and 1725 associated with the speech recognition mode on a touchscreen display (e.g., a touchscreen display 1030 of FIG. 10) at a first luminance and may display the remaining region at a second luminance (less than the first luminance). For another example, on screen 1740, the electronic device 1000 may display a region including the result image 1741 at the first luminance and may display the remaining region at the second luminance.

Figure 18:
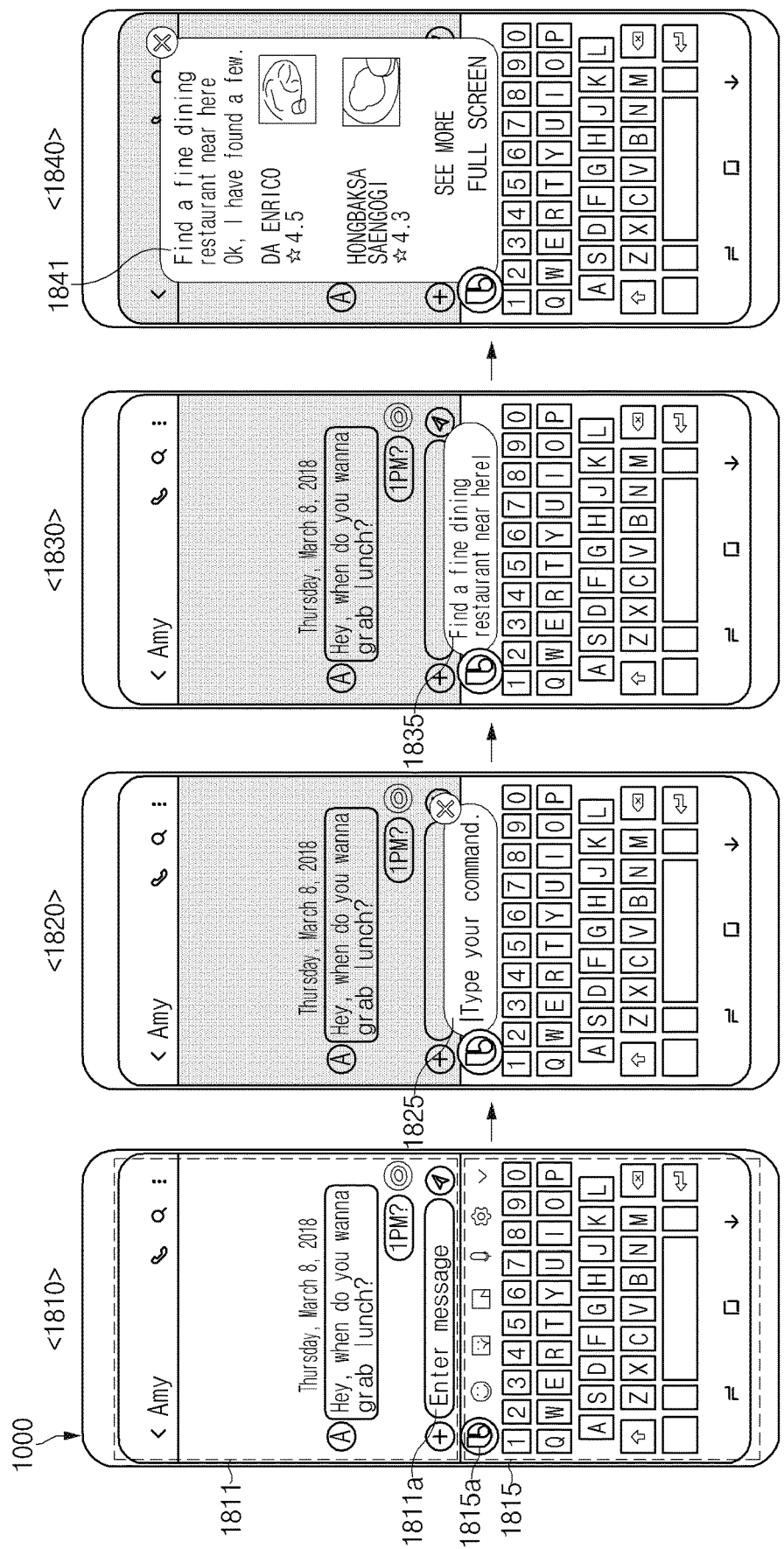
FIG. 18 is a drawing illustrating UI screens for a text input mode of an electronic device according to an embodiment of the disclosure.

FIG. 18 is a drawing illustrating UI screens for a text input mode of an electronic device according to an embodiment of the disclosure.

Referring to FIG. 18, on screen 1810, an electronic device 1000 (e.g., an electronic device 1000 of FIG. 10) may display a screen 1811 where a chat application is running and a virtual keyboard 1815 including a first icon 1815a, in response to a selection for an input window 1811a of the chat application. When identifying a second type of touch input (e.g., a short press) to the first icon 1815a, the electronic device 1000 may convert a current mode into a text input mode.

On screen 1820, the electronic device 1000 may display a text input field 1825 capable of entering text using the virtual keyboard 1815. For example, the electronic device 1000 may display the text input field 1825 to be overlaid with at least a portion of the input window 1811a of the chat application without being overlapped with a region including a key of the virtual keyboard 1815.

On screen 1830, the electronic device 1000 may display a text 1835 entered into the text input field 1825.

On screen 1840, the electronic device 1000 may overlap and display a result image 1841 of performance determined based on the entered text on regions where the virtual keyboard 1815 and the screen 1811 where the chat application (e.g., a first application 1051 of FIG. 11 or 12) is running are displayed.

In the above-mentioned embodiment, the electronic device 1000 may highlight an image associated with the text input mode. For example, on screens 1820 and 1830, the electronic device 1000 may display a region including the text input field 1825 on a touchscreen display (e.g., a touchscreen display 1030 of FIG. 10) at a first luminance and may display the remaining region at a second luminance (less than the first luminance). For another example, on screen 1840, the electronic device 1000 may display a region including the result image 1841 at the first luminance and may display the remaining region at the second luminance.

Figure 19:
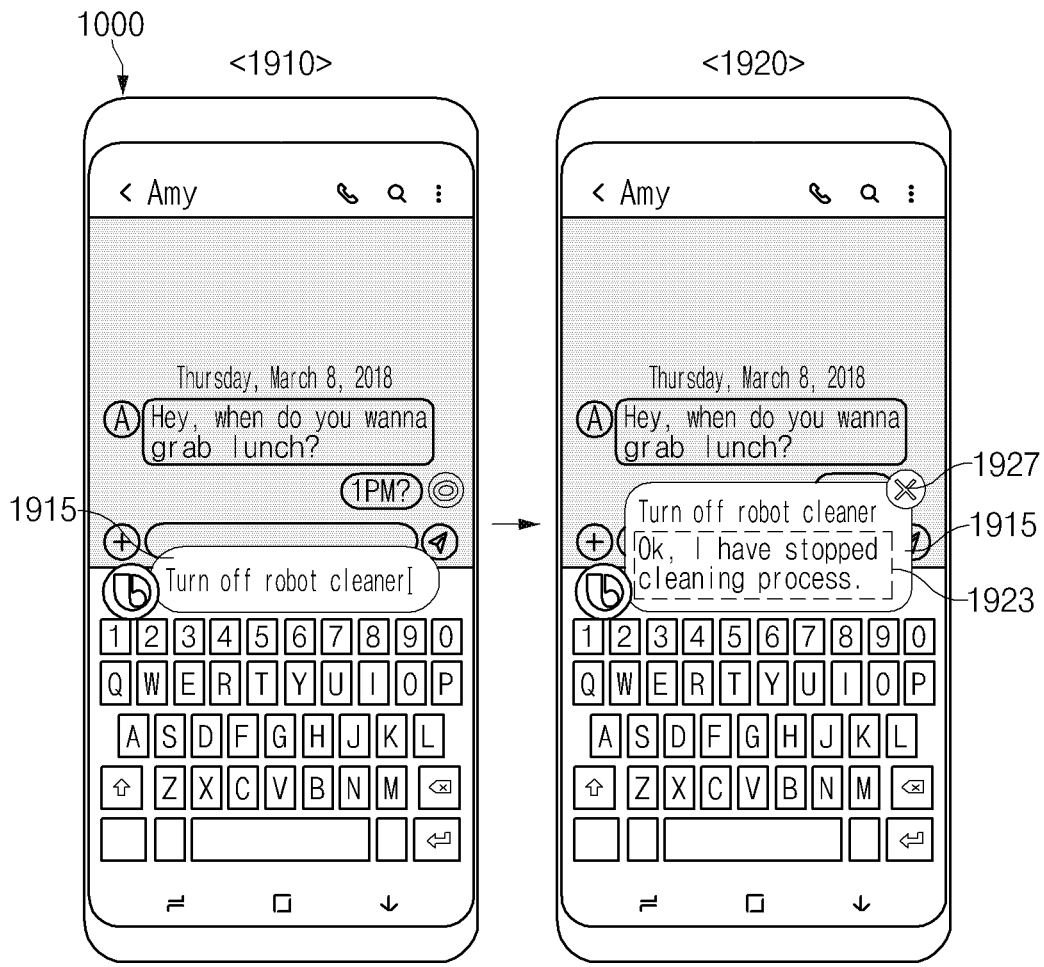
FIG. 19 is a drawing illustrating an example of a result image in an electronic device according to an embodiment of the disclosure.

FIG. 19 is a drawing illustrating an example of a result image in an electronic device according to an embodiment of the disclosure.

Referring to FIG. 19, in operation 1910, an electronic device 1000 (e.g., an electronic device 1000 of FIG. 10) may identify the text "Turn off robot cleaner" which is entered into a text input field 1915. When an icon associated with the text input field 1915 (e.g., an icon associated with a transmission request) is selected, when the text input is stopped during a second specified time after the text is entered into the text input field 1915, or when a specified sign (e.g., a period or a question mark) is entered into the text input field 1915, the electronic device 1000 may identify the text entered into the text input field 1915 (as an instruction of a user). The electronic device 1000 may transmit the entered text "Turn off robot cleaner" to an intelligence server (e.g., an intelligence server 300 of FIG. 11). The intelligence server 300 may identify that a goal action corresponding to the "Turn off robot cleaner" turns off the robot cleaner and may transmit a command associated with turning off the robot cleaner and the text "Ok, I have stopped cleaning process" associated with the power-off operation to the electronic device 1000.

In operation 1920, the electronic device 1000 may receive a power-off command from the intelligence server 300 and may run an application (a third application) for controlling the robot cleaner to transmit the power-off command to the robot cleaner. Thereafter, the electronic device 1000 may identify that the turning-off of the robot cleaner is completed and may display a result image 1923 including the text "Ok, I have stopped cleaning process" associated with the power-off operation on the text input field 1915.

After operation 1920, when an icon 1927 associated with ending the displaying of the text input field 1915 is selected, the electronic device 1000 may end the text input mode and may fail to display the text input field 1915.

Figure 20:
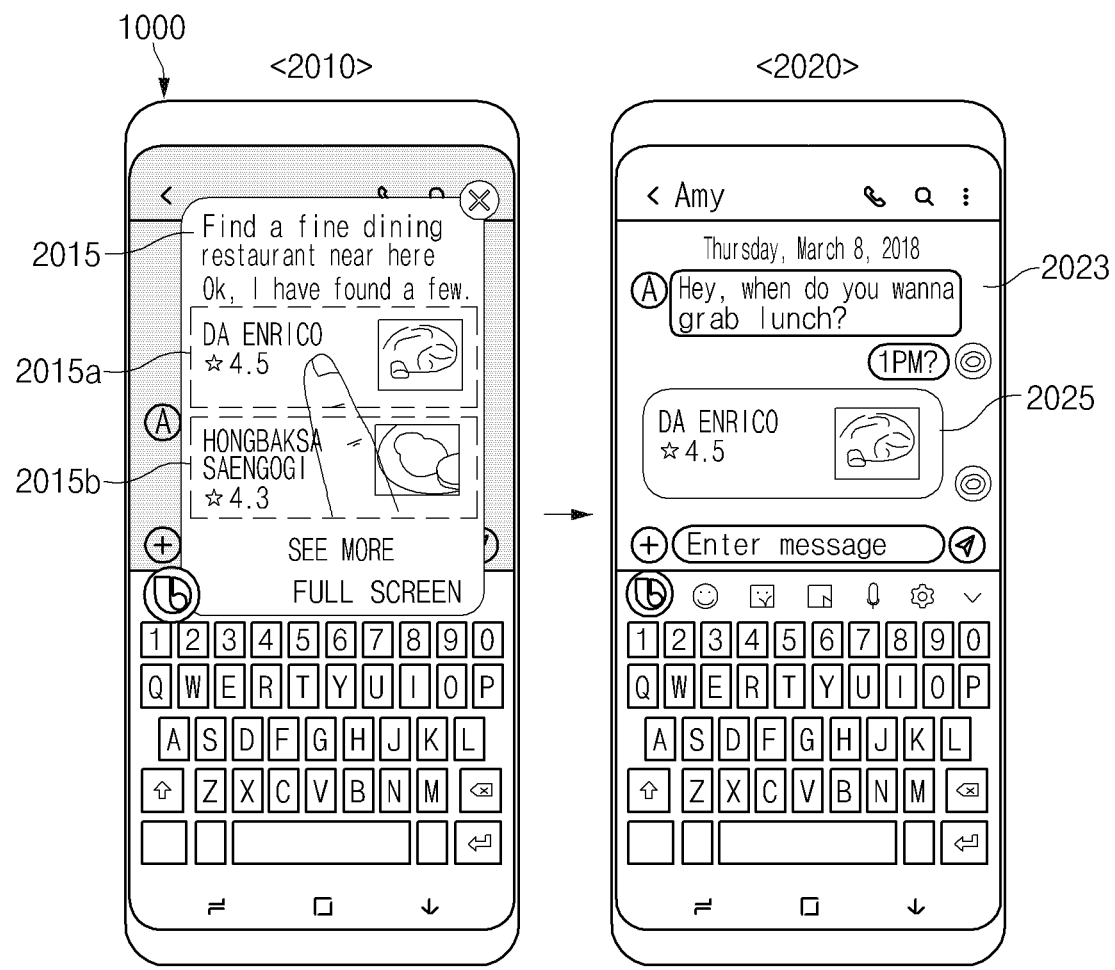
FIG. 20 is a drawing illustrating a UI screen of a process of displaying a result image on a screen where a first application of an electronic device is running according to an embodiment of the disclosure.

FIG. 20 is a drawing illustrating a UI screen of a process of displaying a result image on a screen where a first application of an electronic device is running according to an embodiment of the disclosure.

Referring to FIG. 20, an electronic device 1000 (e.g., an electronic device 1000 of FIG. 10) may input a displayed result image 2015 to an input window of a first application. The result image 2015 may be displayed on, for example, screens 1710 to 1740 of FIG. 17 or screens 1810 to 1840 of FIG. 18.

The electronic device 1000 may display a result image including nearby restaurant information based on a speech recognition mode or a text input mode, while a chat application (the first application) is running.

On screen 2010, the electronic device 1000 may display the result image 2015 including first restaurant information 2015a and second restaurant information 2015b, in response to the user utterance "Find a fine dining restaurant near here". When identifying a selection (e.g., a touch) for the first restaurant information 2015a, the electronic device 1000 may identify that the first restaurant information 2015a is entered in an input window of the first application.

On screen 2020, the electronic device 1000 may display the first restaurant information 2015a on a screen 2023 where the first application is running. For example, the electronic device 1000 may display the first restaurant information 2015a on the chat window 2023 of the chat application as display 2025.

Figure 21:
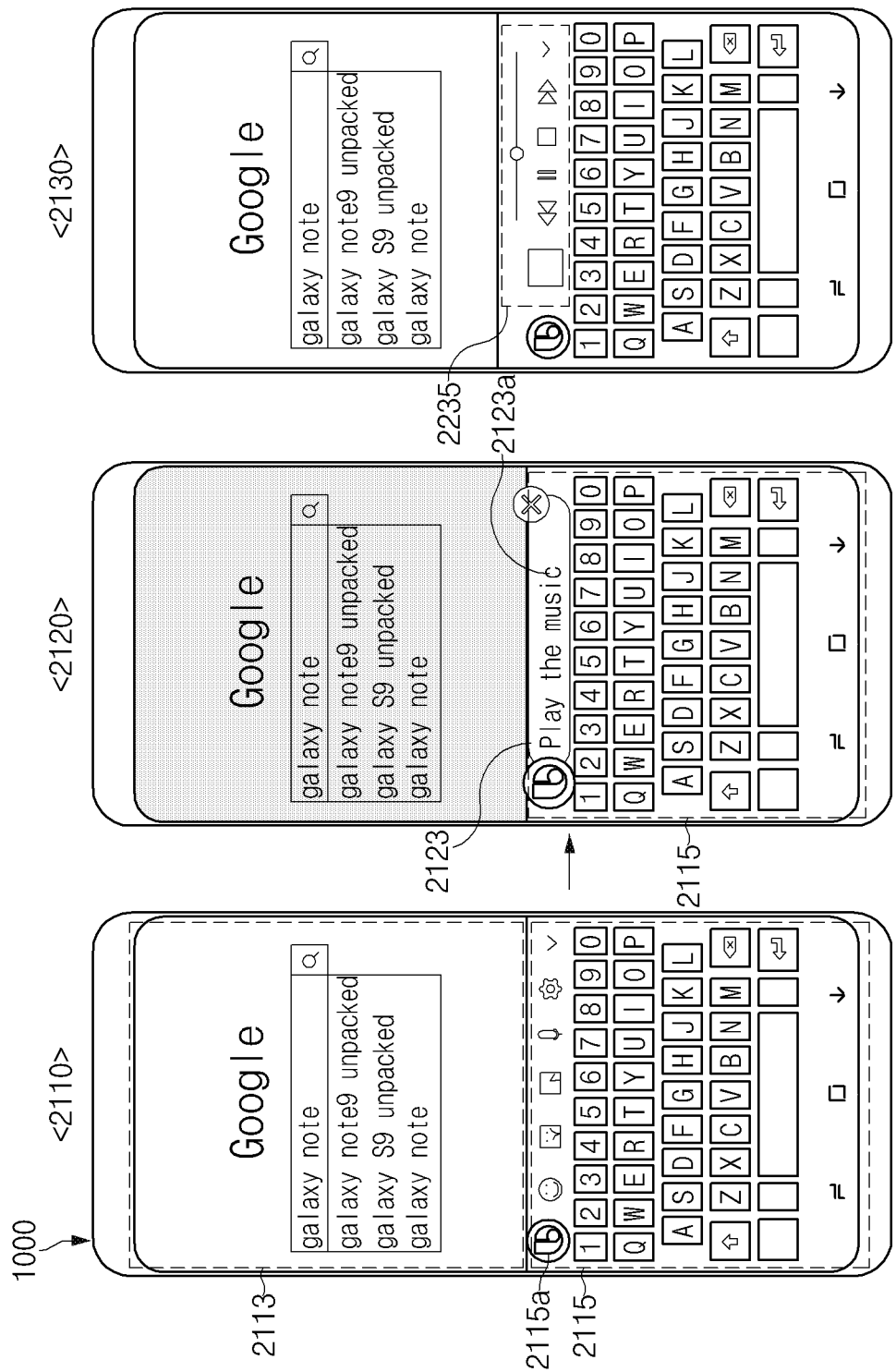
FIG. 21 is a drawing illustrating another example of a result image in an electronic device according to an embodiment of the disclosure.

FIG. 21 is a drawing illustrating another example of a result image in an electronic device according to an embodiment of the disclosure.

Referring to FIG. 21, an electronic device 1000 (e.g., an electronic device 1000 of FIG. 10) may provide a music playback function using a music playback application based on a text input mode or a speech recognition mode, while a web browser is running.

When a user requests a text input during Internet search using the web browser, on screen 2110, the electronic device 1000 may display a virtual keyboard 2115 including a first icon 2115a and a screen 2113 where the web browser is running Thereafter, the electronic device 1000 may identify a second type of touch input (e.g., a short press) to the first icon 2115a included in the virtual keyboard 2115 and may convert a current mode into a text input mode.

On screen 2120, the electronic device 1000 may display the text 2123a "Play the music" entered into a text input field 2123 in the text input mode. On screen 2120, the electronic device 1000 may display a region including the text input field 2123 and the virtual keyboard 2115 at a luminance higher than the remaining region.

On screen 2130, the electronic device 1000 may display a result image 2235 according to an operation corresponding to the entered text "Play the music" on a region on which the virtual keyboard 2115 is displayed. The result image 2235 may include, for example, information (e.g., a music title) about music which is being played in the music playback application and an operable music playback related menu (e.g., a play menu, a stop menu, a pause menu, a next play menu, or a previous play menu). In this regard, the electronic device 1000 may perform an operation of playing the music and may display information about music which is being played and a menu associated with playing music which is being played.

Figure 22:
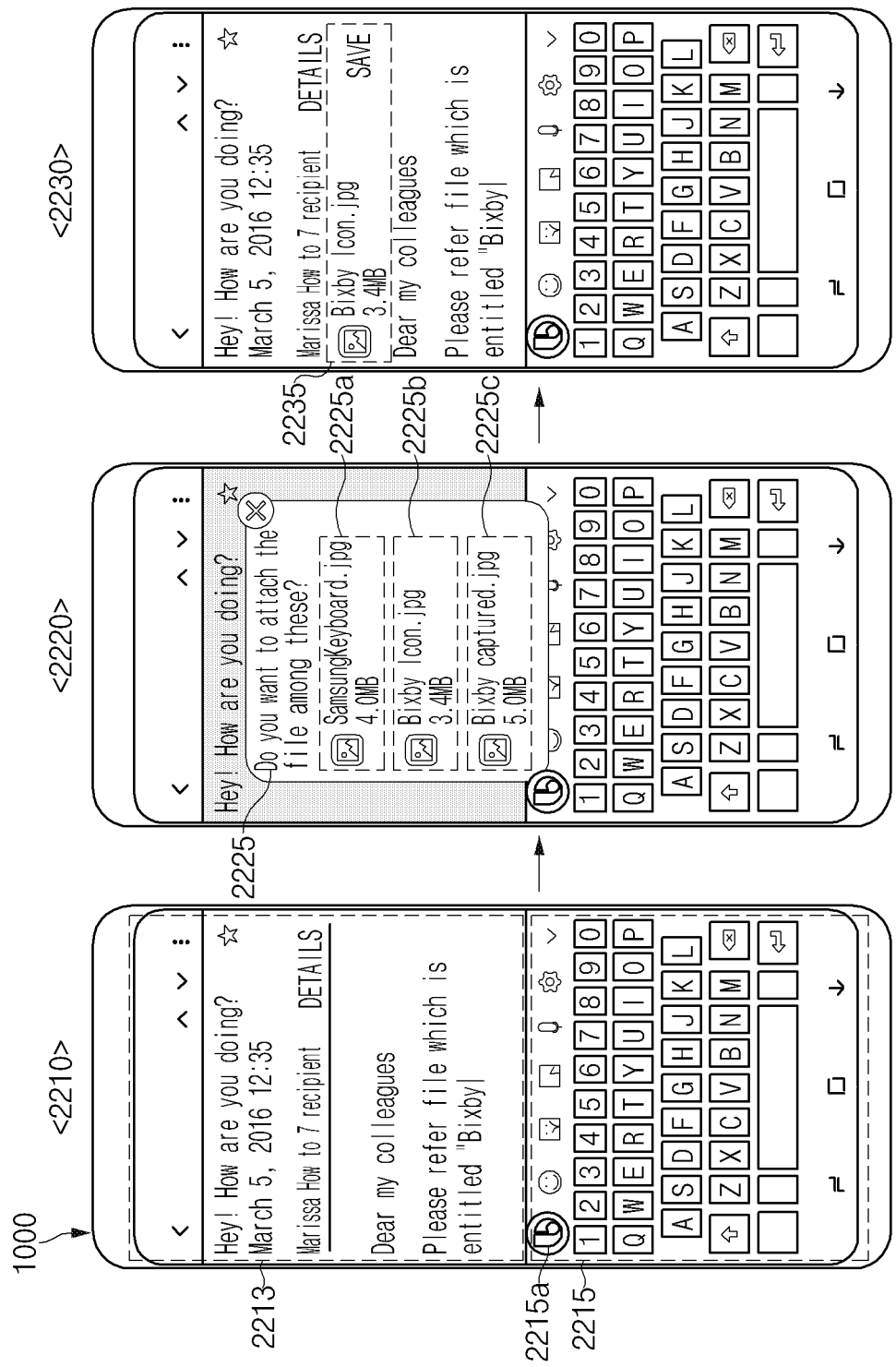
FIG. 22 is a drawing illustrating another example of a result image in an electronic device according to an embodiment of the disclosure.

FIG. 22 is a drawing illustrating another example of a result image in an electronic device according to an embodiment of the disclosure.

Referring to FIG. 22, an electronic device 1000 (e.g., an electronic device 1000 of FIG. 10) may search for a file to be attached to a mail application based on a text input mode or a speech recognition mode, while the mail application 2213 is running.

On screen 2210, the electronic device 1000 may convert a current mode into the speech recognition mode in response to a first type of touch input (e.g., a long press) to a first icon 2215a on a virtual keyboard 2215 including the first icon 2215a. For example, when a user selects a text input window for writing a mail using the mail application, the electronic device 1000 may display the virtual keyboard 2215 including the first icon 2215a. When identifying the first type of touch input to the first icon 2215a, the electronic device 1000 may convert the current mode into the speech recognition mode and may receive, for example, the voice input "Attach the image file stored in my folder to the mail" in the speech recognition mode.

On screen 2220, the electronic device 1000 may display a result image 2225 including first image information 2225a, second image information 2225b, and third image information 2225c stored in "my folder", in response to the "Attach the image file stored in my folder to the mail". Each of the first image information 2225a, the second image information 2225b, and the third image information 2225c may be associated with a mail attachment function of the first image information 2225a, the second image information 2225b, and the third image information 2225c. Thus, when the second image information 2225b is selected, the electronic device 1000 may determine the second image information 2225b as an attached file of the mail application.

On screen 2230, the electronic device 1000 may display a result image 2235 in which the second image information 2225b is attached to a mail which is being written using the mail application. For example, the electronic device 1000 may attach the second image information 2225b as an attached file of the mail which is being written using the mail application and may display the result image 2235.

Figure 23:
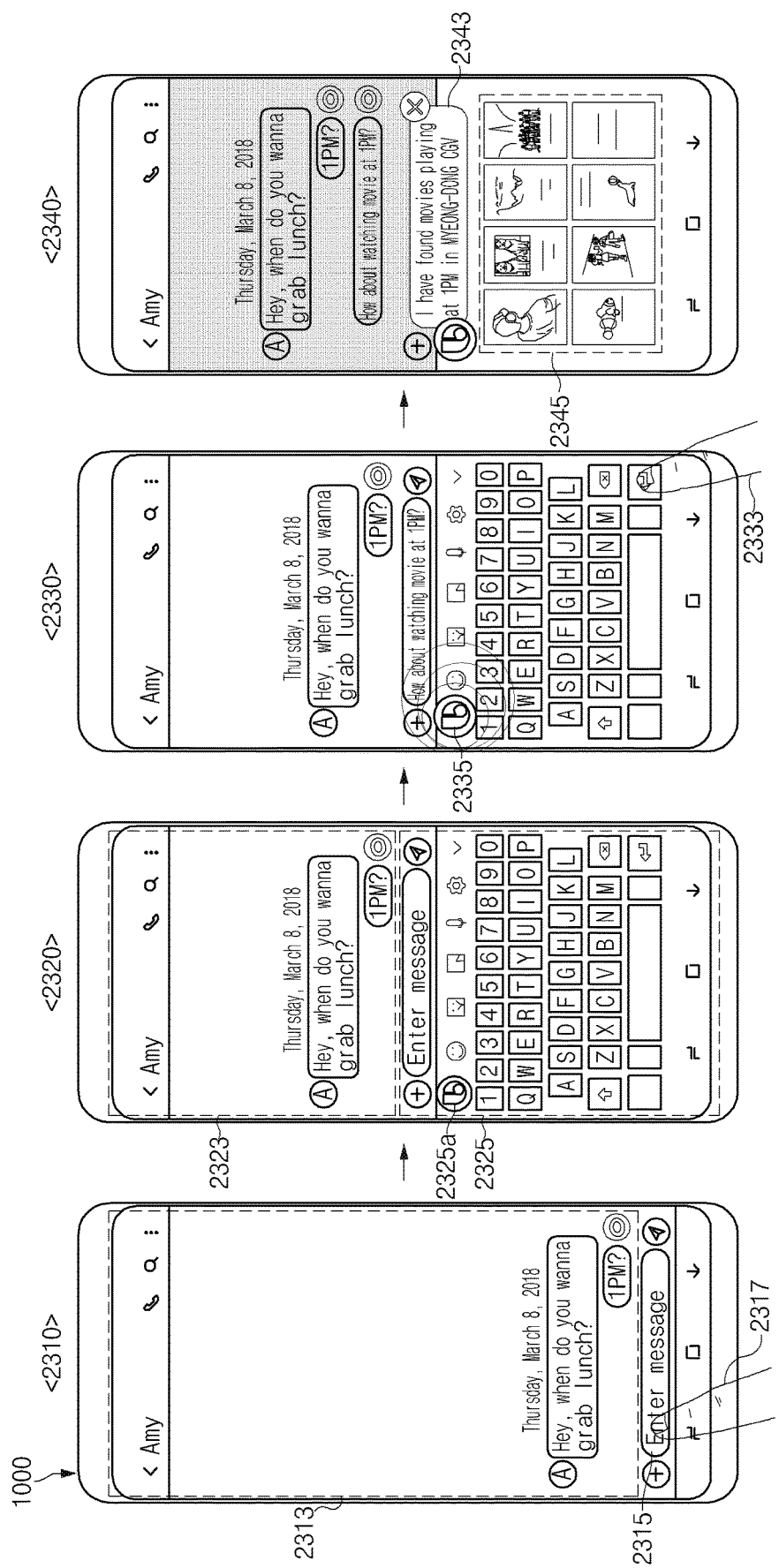
FIG. 23 is a drawing illustrating UI screens for a text monitoring mode of an electronic device according to an embodiment of the disclosure.

FIG. 23 is a drawing illustrating UI screens for a text monitoring mode of an electronic device according to an embodiment of the disclosure.

Referring to FIG. 23, when a test monitoring function for a first application is set, an electronic device 1000 (e.g., an electronic device 1000 of FIG. 10) may monitor texts entered in an input window of the first application and may provide a result image corresponding to at least some of the entered texts (a text monitoring mode).

On screen 2310, the electronic device 1000 may display screens 2313 and 2315 where a chat application is running, including the chat window 2313 and the input window 2315, while the chat application is running.

When identifying a touch input 2317 to the input window 2315 of screen 2310, on screen 2320, the electronic device 1000 may display a virtual keyboard 2325 including a first icon 2325a and a screen 2323 where the chat application is running.

After text is entered in the input window 2315 in the text monitoring mode, when identifying a request 2333 associated with transmitting the entered text, on screen 2330, the electronic device 1000 may display an object 2335 associated with monitoring text. The request 2333 associated with transmitting the entered text may be that the send key included in the virtual keyboard 2325 is touched. The object 2335 associated with monitoring text may indicate a text monitoring mode and may be, for example, concentric circles, a color of which is gradually brightened as it is away from the center of the first icon 2325a, on the periphery of the first icon 2325a. When identifying the request 2333 associated with transmitting the entered text, the electronic device 1000 may transmit the text entered in the input window 2315 to a chat server which is communicating with the chat application and an intelligence server (e.g., an intelligence server 300 of FIG. 11) which communicates with a client module (e.g., a client module 1052 of FIG. 11).

On screen 2340, the electronic device 1000 may display result images 2343 and 2345 according to an operation corresponding to the entered text "How about watching movie at 1 PM". In this regard, the intelligence server 300 may execute a plan corresponding to the entered text "How about watching movie at 1 PM" and may search for information about movies bookable after 1 PM in movie theaters near a specified place. The intelligence server 300 may provide content including information about performed records "I have found movies playing at 1 PM Myeong-dong CGV" and poster images of the found movies to the electronic device 1000. The electronic device 1000 may receive the content from the intelligence server 300 and may display the result images 2343 and 2345 including information 2343 about the performed records and the poster images 2345 based on the received content.

Figure 24:
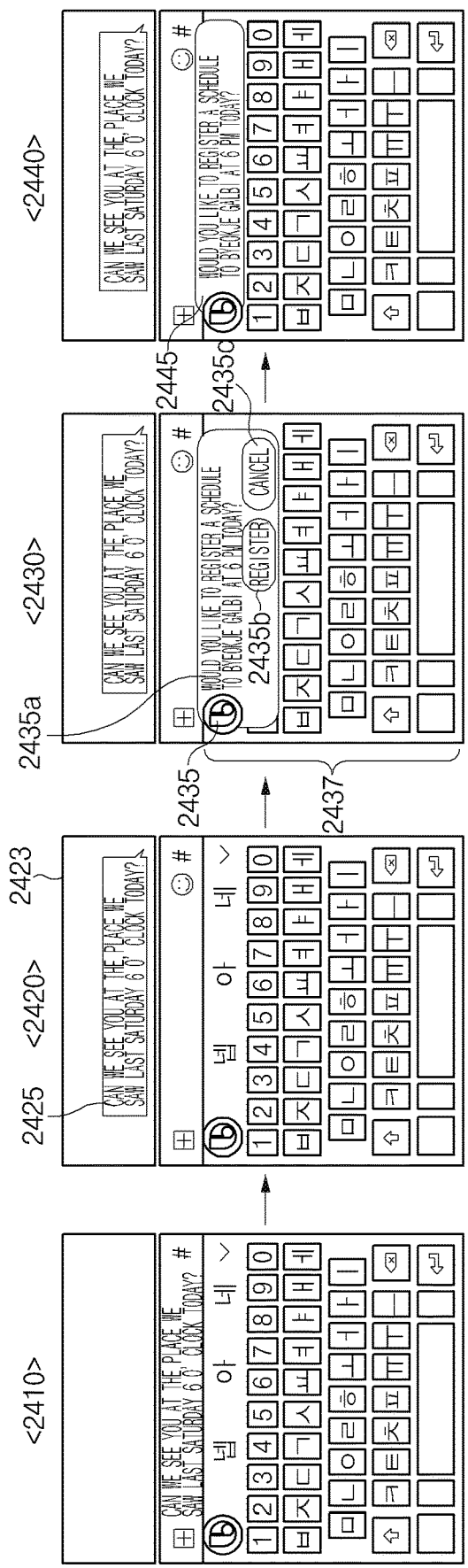
FIG. 24 is a drawing illustrating a multitasking method in a text monitoring mode of an electronic device according to an embodiment of the disclosure.

FIG. 24 is a drawing illustrating a multitasking method in a text monitoring mode of an electronic device according to an embodiment of the disclosure.

Referring to FIG. 24, in operation 2410, an electronic device (e.g., an electronic device 1000 of FIG. 10) may identify a request (selection of a send key) associated with transmitting the text "Can we see you at the place we saw last Saturday at 6 o'clock today?" entered in a chat window of a chat application.

In operation 2420, the electronic device 1000 may transmit the entered text "Can we see you at the place we saw last Saturday at 6 o'clock today?" 2425 to a chat server which is communicating with the chat application and an intelligence server (e.g., an intelligence server 300 of FIG. 11). The electronic device 1000 may display the "Can we see you at the place we saw last Saturday at 6 o'clock today?" 2425 on a chat window 2423 depending on a response received from the chat server. After operation 2420, the intelligence server 300 may transmit an action execution command to configure a result image including a registration request key 2435*b* associated with an operation of registering the schedule "Byeokje Galbi at 6 pm" with today's date of a schedule management application by a client module (e.g., a client module 1052 of FIG. 11) and a registration rejection key 2435*c* for failing to perform the operation, and a text 2435*a* describing the operation to the electronic device 1000 in response to the received text "Can we see you at the place we saw last Saturday at 6 o'clock today?" 2425. In this regard, the intelligence server 300 may perform an operation of identifying today's date and an operation of identifying the state during the chat at last Saturday and the place at which we met on, for example, the schedule management application.

In operation 2430, the electronic device 1000 may display a first screen 2435, including the text 2435*a* "Would you like to register a schedule to Byeokje Galbi at 6 pm today", the registration request key 2435*b*, and the registration rejection key 2435*c*, on a part of a virtual keyboard 2437 depending on the action execution command received from the intelligence server 300.

After operation 2430, the client module 1052 of the electronic device 1000 may identify that the registration request key 2435*b* is selected. In operation 2440, the client module 1052 of the electronic device 1000 may run the schedule management application as a background application and may register the schedule "Byeokje Galbi at 6 pm" with today's date of the schedule management application. The electronic device 1000 may display a second screen 2445 including the text "Would you like to register a schedule to Byeokje Galbi at 6 pm today" for guiding the schedule registration result. In an embodiment, the electronic device 1000 may cooperate with the intelligence server 300. For example, the electronic device 1000 may report a selection for the registration request key 2435*b* to the intelligence server 300, may receive content including the text "Would you like to register a schedule to Byeokje Galbi at 6 pm today" for guiding the schedule registration result from the intelligence server 300, and may display the second screen 2445 based on the received content.

An electronic device (e.g., an electronic device 101 of FIG. 1) according to the above-mentioned various embodiments may include a microphone (e.g., a microphone 220 of FIG. 2), a touchscreen display (e.g., a display 240 of FIG. 2), a processor (e.g., a processor 260 of FIG. 2) operatively connected with the microphone and the touchscreen display, and a memory (e.g., a memory 250 of FIG. 2) operatively connected with the processor. The memory may be configured to store instructions. The instructions, when executed, may cause the processor to display a virtual keyboard including a first icon on the touchscreen display in response to a request associated with a text input to a first application (e.g., a first application 1051 of FIG. 11) which is running, execute a client module (e.g., a client module 251 of FIG. 2) associated with a second application (e.g., an intelligence app) different from the first application, based on an input to the first icon, identify a text entered through the virtual keyboard or a voice input received via the microphone, using the client module, determine an operation corresponding to the entered text and the voice input using the client module, and display a result image according to the operation on at least one region between a first region of the touchscreen display, on which the virtual keyboard is displayed, or a second region of the touchscreen display, on which a screen where the first application is running is displayed.

According to various embodiments, the instructions may cause the processor (e.g., the processor 260 of FIG. 2) to display an object indicating that a voice input is being received, based on a first type of touch input to the first icon and identify the voice input received via the microphone (e.g., the microphone 220 of FIG. 2) using the client module (e.g., the client module 251 of FIG. 2).

According to various embodiments, the instructions may cause the processor (e.g., the processor 260 of FIG. 2) to display a text input field based on a second type of touch input to the first icon and transmit a text entered into the text input field via the virtual keyboard to the client module (e.g., the client module 251 of FIG. 2).

According to various embodiments, the instructions may cause the processor (e.g., the processor 260 of FIG. 2) to fail to transmit a text entered into the text input field to the first application (e.g., the first application 1051 of FIG. 11).

According to various embodiments, the instructions may cause the processor (e.g., the processor 260 of FIG. 2) to, when identifying a request associated with ending the displaying of the text input field, fail to display the text input field.

According to various embodiments, the instructions may cause the processor (e.g., the processor 260 of FIG. 2) to display a region including the result image of the touchscreen display (e.g., the display 240 of FIG. 2) at a luminance higher than the other region of the touchscreen display.

According to various embodiments, the instructions may cause the processor (e.g., the processor 260 of FIG. 2) to, when the result image is associated with specified performance of a third application (e.g., a third application 1053 of FIG. 11) different from the first application (e.g., the first application 1051 of FIG. 11) and the second application (e.g., the intelligence app), execute the third application to perform the specified performance and display the result image.

According to various embodiments, the instructions may cause the processor (e.g., the processor 260 of FIG. 2) to obtain a text format of file corresponding to the entered text or the voice input using the client module (e.g., the client module 251 of FIG. 2), convert the text format of file into a specified format of the result image using a fourth application associated with the virtual keyboard, and display the specified format of the result image on the at least one region using the fourth application.

According to various embodiments, the instructions may cause the processor (e.g., the processor 260 of FIG. 2) to, when information included in the result image is selected, determine the selected information as information entered in an input window of the first application (e.g., the first application 1051 of FIG. 11).

An electronic device (e.g., an electronic device 101 of FIG. 2) according to the above-mentioned various embodiments may include a microphone (e.g., a microphone 220 of FIG. 2), a touchscreen display (e.g., a display 240 of FIG. 2), a processor (e.g., a processor 260 of FIG. 2) operatively connected with the microphone and the touchscreen display, and a memory (e.g., a memory 250 of FIG. 2) operatively connected with the processor. The memory may be configured to store instructions. The instructions, when executed, may cause the processor to display a virtual keyboard including a first icon associated with executing a second application (e.g., an intelligence app) different from a first application (e.g., a first application 1051 of FIG. 11) on the touchscreen display in response to a request associated with a text input to the first application, while the first application is running, when receiving a request associated with transmitting a text entered through a virtual keyboard, transmit the entered text to the first application and a client module (e.g., a client module 251 of FIG. 2) associated with the second application, determine an operation corresponding to the entered text using the client module, and display a result image corresponding to the operation on at least one region between a first region of the touchscreen display, on which the virtual keyboard is displayed, or a second region of the touchscreen display, on which a screen where the first application is running is displayed.

According to various embodiments, the instructions may cause the processor (e.g., the processor 260 of FIG. 2) to, when identifying a specified trigger word from the entered text using the client module (e.g., the client module 251 of FIG. 2), determine a sentence including the specified trigger word and determine a result image corresponding to the determined sentence using the client module.

According to various embodiments, the instructions may cause the processor (e.g., the processor 260 of FIG. 2) to, when a function associated with monitoring text is set through the second application (e.g., the intelligence app), transmit a text entered through the virtual keyboard to the first application (e.g., the first application 1051 of FIG. 11) and the client module (e.g., the client module 251 of FIG. 2) and, when the function associated with monitoring text is not set, transmit the entered text to the first application in response to the request associated with transmitting the text.

According to various embodiments, the instructions may cause the processor (e.g., the processor 260 of FIG. 2) to display a region including the result image of the touchscreen display (e.g., the display 240 of FIG. 2) at a luminance higher than the other region of the touchscreen display.

A multitasking method in an electronic device (e.g., an electronic device 101 of FIG. 2) according to the above-mentioned various embodiments may include displaying a virtual keyboard including a first icon on a touchscreen display (e.g., a display 240 of FIG. 2) in response to a request associated with a text input to a first application (e.g., a first application 1051 of FIG. 11) which is running, executing a client module (e.g., a client module 251 of FIG. 2) associated with a second application (e.g., an intelligence app) different from the first application, based on an input to the first icon, identifying a text entered through the virtual keyboard or a voice input received via a microphone (e.g., a microphone 220 of FIG. 2) using the client module, determining an operation corresponding to the entered text or the voice input using the client module, and displaying a result image according to the operation on at least one region between a first region of the touchscreen display, on which the virtual keyboard is displayed, or a second region of the touchscreen display, on which a screen where the first application is running is displayed.

According to various embodiments, the identifying may include displaying an object indicating that a voice input is being received, based on a first type of touch input to the first icon and identifying a voice input received via the microphone (e.g., the microphone 220 of FIG. 2) using the client module (e.g., the client module 251 of FIG. 2).

According to various embodiments, the identifying may include displaying a text input field based on a second type of touch input to the first icon and delivering a text entered into the text input field through the virtual keyboard to the client module (e.g., the client module 251 of FIG. 2).

According to various embodiments, the delivering may include failing to deliver the text entered into the text input field to the first application (e.g., the first application 1051 of FIG. 11).

According to various embodiments, the method may further include, when information included in the result image is selected, determining the selected information as information entered in an input window of the first application (e.g., the first application 1051 of FIG. 11).

According to various embodiments, the displaying may include displaying a region including the result image of the touchscreen display (e.g., the display 240 of FIG. 2) at a luminance higher than the other region of the touchscreen display.

According to various embodiments, the displaying may include, when the result image is associated with specified performance of a third application (e.g., a third application 1053 of FIG. 11) different from the first application (e.g., the first application 1051 of FIG. 11) and the second application (e.g., the intelligence app), displaying the result image as a result of the specified performance using the third application.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the disclosure, the electronic device may support to conveniently use a plurality of functions providable by the electronic device or an intelligence server using a plurality of applications. In addition, various effects directly or indirectly ascertained through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a microphone;
   a touchscreen display;
   a processor operatively connected with the microphone and the touchscreen display; and
   a memory operatively connected with the processor,
   wherein the memory is configured to store instructions, and
   wherein the instructions, when executed, cause the processor to:
      display a virtual keyboard including a first icon on the touchscreen display in response to a request associated with a text input to a first application which is running,
      execute a client module associated with a second application different from the first application, based on an input to the first icon included in the virtual keyboard,
      in case that the input to the first icon included in the virtual keyboard is a first type of touch input, identify a data entered as a voice input received via the microphone using the client module,
      in case that the input to the first icon included in the virtual keyboard is a second type of touch input, identify the data entered as text entered through the virtual keyboard using the client module,
      determine an operation corresponding to the entered data using the client module, and
      display a result image according to the operation on at least one region between a first region of the touchscreen display, on which the virtual keyboard is displayed, or a second region of the touchscreen display, on which a screen where the first application is running is displayed.

2. The electronic device of claim 1, wherein the instructions further cause the processor to:
   in case that the input to the first icon included in the virtual keyboard is the first type of touch input, display an object indicating that the voice input is being received.

3. The electronic device of claim 1, wherein the instructions further cause the processor to:
   in case that the input to the first icon included in the virtual keyboard is the second type of touch input, display a text input field in the virtual keyboard, and
   transmit the text entered into the text input field to the client module.

4. The electronic device of claim 3, wherein the instructions further cause the processor to:
   fail to transmit the text entered into the text input field to the first application.

5. The electronic device of claim 3, wherein the instructions further cause the processor to:
   when identifying a request associated with ending the displaying of the text input field, fail to display the text input field.

6. The electronic device of claim 1, wherein the instructions further cause the processor to:
  display a region including the result image of the touchscreen display at a luminance higher than the other region of the touchscreen display.

7. The electronic device of claim 1, wherein the instructions further cause the processor to:
  when the result image is associated with specified performance of a third application different from the first application and the second application, execute the third application to perform the specified performance and display the result image.

8. The electronic device of claim 1, wherein the instructions further cause the processor to:
  obtain a text format of file corresponding to the text entered or the voice input using the client module,
  convert the text format of file into a specified format of the result image using a fourth application associated with the virtual keyboard, and
  display the specified format of the result image on the at least one region using the fourth application.

9. The electronic device of claim 1, wherein the instructions further cause the processor to:
  when information included in the result image is selected, determine the selected information as information entered in an input window of the first application.

10. An electronic device, comprising:
  a microphone;
  a touchscreen display;
  a processor operatively connected with the microphone and the touchscreen display; and
  a memory operatively connected with the processor,
  wherein the memory is configured to store instructions,
  wherein the instructions, when executed, cause the processor to:
    display a virtual keyboard including a first icon associated with running a second application different from a first application on the touchscreen display in response to a request associated with a text input to the first application, while the first application is running,
    when receiving another request associated with transmitting a data entered, transmit the entered data to the first application and a client module associated with the second application,
    determine an operation corresponding to the entered data using the client module, and
    display a result image corresponding to the operation on at least one region between a first region of the touchscreen display, on which the virtual keyboard is displayed, or a second region of the touchscreen display, on which a screen where the first application is running is displayed,
  wherein, in case that the input to the first icon included in the virtual keyboard is a first type of touch input, the data entered comprises a voice input received via the microphone using the client module, and
  wherein, in case that the input to the first icon included in the virtual keyboard is a second type of touch input, the data entered comprises text entered through the virtual keyboard using the client module.

11. The electronic device of claim 10, wherein the instructions further cause the processor to:
  in case that the input to the first icon included in the virtual keyboard is the second type of touch input, when identifying a specified trigger word from the entered text using the client module, determine a sentence including the specified trigger word, and
  determine a result image corresponding to the determined sentence using the client module.

12. The electronic device of claim 10, wherein the instructions further cause the processor to:
  in case that the input to the first icon included in the virtual keyboard is the second type of touch input:
    when a function associated with monitoring text is set through the second application, transmit a text entered through the virtual keyboard to the first application and the client module in response to the request associated with transmitting the text, and
    when the function associated with monitoring text is not set, transmit the entered text to the first application in response to the other request associated with transmitting the text.

13. The electronic device of claim 10, wherein the instructions further cause the processor to:
  display a region including the result image of the touchscreen display at a luminance higher than the other region of the touchscreen display.

14. A multitasking method in an electronic device, the method comprising:
  displaying a virtual keyboard including a first icon on a touchscreen display in response to a request associated with a text input to a first application which is running,
  executing a client module associated with a second application different from the first application, based on an input to the first icon,
  in case that the input to the first icon included in the virtual keyboard is a first type of touch input, identifying a data entered as a voice input received via a microphone using the client module,
  in case that the input to the first icon included in the virtual keyboard is a second type of touch input, identifying the data entered as text entered through the virtual keyboard using the client module,
  determining an operation corresponding to the entered data using the client module, and
  displaying a result image according to the operation on at least one region between a first region of the touchscreen display, on which the virtual keyboard is displayed, or a second region of the touchscreen display, on which a screen where the first application is running is displayed.

15. The method of claim 14, wherein, in case that the input to the first icon included in the virtual keyboard is the first type of touch input, the identifying of the data entered comprises: displaying an object indicating that the voice input is being received.

16. The method of claim 14, wherein, in case that the input to the first icon included in the virtual keyboard is the second type of touch input, the identifying comprises:
  displaying a text input field in the virtual keyboard, and
  delivering the text entered into the text input field to the client module.

17. The method of claim 16, wherein the delivering comprises:
  failing to deliver the text entered into the text input field to the first application.

18. The method of claim 14, further comprising:
  when information included in the result image is selected, determining the selected information as information entered in an input window of the first application.

19. The method of claim 14, wherein the displaying comprises:

displaying a region including the result image of the touchscreen display at a luminance higher than the other region of the touchscreen display.

20. The method of claim 14, wherein the displaying comprises:
when the result image is associated with specified performance of a third application different from the first application and the second application, displaying the result image as a result of the specified performance using the third application.

* * * * *